United States Patent
Hendron et al.

(10) Patent No.: US 11,162,241 B2
(45) Date of Patent: Nov. 2, 2021

(54) CONTROLLING MOBILE MACHINES WITH A ROBOTIC ATTACHMENT

(71) Applicant: Deere & Company, Moline, IL (US)

(72) Inventors: Scott S. Hendron, Dubuque, IA (US); Mark J. Cherney, Dubuque, IA (US); Michael G. Kean, Dubuque, IA (US); John J. O'Brien, Dubuque, IA (US)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 15/962,608

(22) Filed: Apr. 25, 2018

(65) Prior Publication Data

US 2019/0301131 A1 Oct. 3, 2019

Related U.S. Application Data

(63) Continuation-in-part of application No. 15/937,127, filed on Mar. 27, 2018, now Pat. No. 10,689,831.

(51) Int. Cl.
*E02F 3/96* (2006.01)
*E02F 9/20* (2006.01)
*E02F 3/43* (2006.01)
*E02F 9/26* (2006.01)

(52) U.S. Cl.
CPC .............. *E02F 3/963* (2013.01); *E02F 3/437* (2013.01); *E02F 9/205* (2013.01); *E02F 9/265* (2013.01)

(58) Field of Classification Search
CPC . E02F 3/963; E02F 3/437; E02F 9/205; E02F 9/265
See application file for complete search history.

(56) References Cited

U.S. PATENT DOCUMENTS

| 4,604,787 | A | * | 8/1986 | Silvers, Jr. | ......... B23Q 3/15553 483/55 |
| 4,995,148 | A | * | 2/1991 | Bonomi | ................. B21J 15/142 29/26 A |
| 5,477,268 | A | * | 12/1995 | Shimbara | ............. B62D 65/005 348/125 |
| 5,515,599 | A | * | 5/1996 | Best | ..................... B23Q 1/5481 29/38 C |

(Continued)

FOREIGN PATENT DOCUMENTS

| CA | 2694450 A | 8/2011 |
| CN | 102819972 B | 12/2012 |

(Continued)

OTHER PUBLICATIONS

U.S. Appl. No. 15/937,127 Notice of Allowance dated Mar. 5, 2020.

(Continued)

*Primary Examiner* — Sze-Hon Kong
(74) *Attorney, Agent, or Firm* — Joseph R. Kelly; Kelly, Holt & Christenson PLLC

(57) ABSTRACT

A robotic machine includes at least one sensor coupled to the robotic machine configured to generate a signal indicative of a worksurface for which a worksurface operation is to be conducted. The robotic machine also includes a machine and robotic control system configured to receive the signal indicative of the worksurface, identify the worksurface operation to be conducted, and generate control signals for an end effector of the robotic machine to carry out the identified worksurface operation.

16 Claims, 15 Drawing Sheets

(56) References Cited

U.S. PATENT DOCUMENTS

| | | | | |
|---|---|---|---|---|
| 5,570,992 A * | 11/1996 | Lemelson | ............... | B23Q 11/10 414/744.3 |
| 5,636,949 A * | 6/1997 | Nakamura | ............... | B23Q 1/70 408/239 A |
| 5,672,044 A * | 9/1997 | Lemelson | ............... | B66C 23/00 414/744.3 |
| 5,799,419 A | 9/1998 | Seo et al. | | |
| 5,974,643 A * | 11/1999 | Hays | ................. | B23Q 17/2233 29/39 |
| 6,059,048 A | 5/2000 | Subrt | | |
| 6,257,111 B1 * | 7/2001 | Shinohara | ............... | B23B 3/162 29/26 A |
| 7,065,856 B1 * | 6/2006 | Lemelson | ............... | B23Q 41/06 29/563 |
| 7,890,235 B2 * | 2/2011 | Self | ...................... | G05D 1/0033 701/50 |
| 8,457,828 B2 * | 6/2013 | Self | ............................ | E02F 9/24 701/24 |
| 8,644,964 B2 | 2/2014 | Hendron et al. | | |
| 9,050,723 B1 * | 6/2015 | Elazary | .................... | B25J 9/163 |
| 9,415,507 B2 | 8/2016 | Foster et al. | | |
| 9,464,405 B2 | 10/2016 | Friend | | |
| 9,488,449 B2 * | 11/2016 | Opperman | ................ | B25J 5/005 |
| 2002/0193906 A1 * | 12/2002 | Sugiyama | ............... | B23Q 15/00 700/188 |
| 2004/0028507 A1 * | 2/2004 | Massaro | ................... | B01L 9/54 414/4 |
| 2004/0158355 A1 | 8/2004 | Holmqvist et al. | | |
| 2004/0267404 A1 | 12/2004 | Danko | | |
| 2005/0138850 A1 | 6/2005 | Brickner | | |
| 2005/0177292 A1 | 8/2005 | Okamura et al. | | |
| 2005/0262976 A1 * | 12/2005 | Shibui | .................. | B23Q 16/025 82/121 |
| 2006/0041328 A1 * | 2/2006 | McCormick | ............. | B25J 9/161 700/179 |
| 2006/0074525 A1 * | 4/2006 | Close | ..................... | B25J 9/1617 700/245 |
| 2006/0213167 A1 * | 9/2006 | Koselka | ............... | A01B 79/005 56/10.2 A |
| 2007/0107917 A1 * | 5/2007 | Doherty | .................. | F41C 27/04 172/192 |
| 2007/0168100 A1 | 7/2007 | Danko | | |
| 2008/0152005 A1 | 7/2008 | Tang et al. | | |
| 2008/0222883 A1 * | 9/2008 | Ono | ...................... | B23P 21/004 29/787 |
| 2008/0243456 A1 | 10/2008 | Hudetz | | |
| 2009/0050750 A1 * | 2/2009 | Goossen | ............... | B64C 39/024 244/76 R |
| 2009/0069987 A1 | 3/2009 | Omelchenko | | |
| 2010/0017074 A1 | 1/2010 | VerKuilen et al. | | |
| 2010/0068024 A1 * | 3/2010 | Agens | ................... | B66C 3/18 414/729 |
| 2010/0154400 A1 | 6/2010 | Krajnik | | |
| 2010/0157283 A1 | 6/2010 | Kirk | | |
| 2010/0192720 A1 | 8/2010 | Helmer | | |
| 2011/0043515 A1 * | 2/2011 | Stathis | ................. | G01C 15/002 345/419 |
| 2011/0071675 A1 * | 3/2011 | Wells | ..................... | H04N 5/332 700/250 |
| 2011/0083867 A1 | 4/2011 | Leith | | |
| 2011/0150618 A1 * | 6/2011 | Ramun | ................ | B23D 31/008 414/723 |
| 2011/0257816 A1 | 10/2011 | Song et al. | | |
| 2012/0053597 A1 * | 3/2012 | Anvari | ................... | A61B 34/30 606/130 |
| 2012/0143380 A1 | 6/2012 | Weinhardt et al. | | |
| 2012/0152877 A1 * | 6/2012 | Tadayon | .................... | B25J 5/02 212/224 |
| 2012/0165962 A1 * | 6/2012 | Faivre | ................... | G05B 19/106 700/19 |
| 2012/0253528 A1 | 10/2012 | Wan et al. | | |
| 2012/0299322 A1 * | 11/2012 | White | .................. | B25J 15/0019 294/213 |
| 2013/0103193 A1 * | 4/2013 | Roberts | .................. | B23Q 3/155 700/245 |
| 2013/0226341 A1 * | 8/2013 | Sturm | ...................... | B25J 5/007 700/245 |
| 2013/0297046 A1 | 11/2013 | Hendron | | |
| 2014/0067092 A1 | 3/2014 | Cesur et al. | | |
| 2014/0163730 A1 * | 6/2014 | Mian | ......................... | B25J 9/16 700/248 |
| 2014/0208592 A1 * | 7/2014 | Wright | ................... | B25B 11/007 29/897.2 |
| 2014/0287897 A1 * | 9/2014 | George | ............... | B23Q 3/15513 483/1 |
| 2015/0219108 A1 | 8/2015 | Kobayashi | | |
| 2015/0266183 A1 | 9/2015 | Alifragkis | | |
| 2015/0277430 A1 * | 10/2015 | Linnell | ................. | G05B 19/409 700/257 |
| 2016/0011593 A1 * | 1/2016 | Oberoi | ................... | B60G 7/008 701/23 |
| 2016/0016309 A1 | 1/2016 | Swift et al. | | |
| 2016/0054739 A1 | 2/2016 | Palmroth et al. | | |
| 2016/0121486 A1 * | 5/2016 | Lipinski | .................. | B25J 15/04 427/427.3 |
| 2016/0281331 A1 | 9/2016 | Ikegami | | |
| 2016/0288331 A1 * | 10/2016 | Sivich | .................... | B25J 9/1697 |
| 2016/0312432 A1 * | 10/2016 | Wang | ..................... | E02F 9/2012 |
| 2016/0332296 A1 * | 11/2016 | Kurnianto | ............. | B29C 48/865 |
| 2016/0339590 A1 * | 11/2016 | Lin | ...................... | B25J 15/0061 |
| 2016/0375524 A1 * | 12/2016 | Hsu | ........................ | B23K 31/02 228/8 |
| 2017/0008094 A1 * | 1/2017 | Nguyen | ................ | B23B 47/34 |
| 2017/0009471 A1 | 1/2017 | Friend | | |
| 2017/0269607 A1 * | 9/2017 | Fulop | ..................... | B25J 13/006 |
| 2017/0278030 A1 * | 9/2017 | Pettersson | ............. | G06Q 10/00 |
| 2017/0364073 A1 * | 12/2017 | Guy | ...................... | G05D 1/0293 |
| 2018/0071819 A1 * | 3/2018 | Connor | ................ | B33Y 50/02 |
| 2018/0171580 A1 | 6/2018 | Howell | | |
| 2018/0266247 A1 * | 9/2018 | Lundh | ..................... | G06Q 50/02 |
| 2018/0283017 A1 * | 10/2018 | Telleria | ................ | B25J 11/0075 |
| 2018/0283019 A1 * | 10/2018 | Telleria | ................ | B05D 3/0413 |
| 2018/0348742 A1 * | 12/2018 | Byrne | ............. | G05B 19/41865 |
| 2019/0003148 A1 | 1/2019 | Andou | | |
| 2019/0033877 A1 * | 1/2019 | Wei | ...................... | E02F 9/2054 |
| 2019/0038367 A1 * | 2/2019 | Ciriello | ................... | A61B 34/00 |
| 2019/0161939 A1 | 5/2019 | Hokkanen | | |
| 2019/0161942 A1 * | 5/2019 | Hokkanen | ................ | G06F 3/011 |
| 2019/0246858 A1 * | 8/2019 | Karasikov | ............. | A47L 9/2836 |
| 2019/0255623 A1 * | 8/2019 | Williamson | ...... | B23B 31/16041 |
| 2019/0255668 A1 * | 8/2019 | Williamson | ........... | B23Q 17/20 |
| 2019/0275629 A1 | 9/2019 | Ogawa | | |
| 2019/0299406 A1 * | 10/2019 | Kurokawa | ............ | B25J 13/006 |
| 2019/0301144 A1 | 10/2019 | Kean | | |
| 2019/0314910 A1 * | 10/2019 | Weixler | ................. | B23F 19/10 |
| 2020/0174460 A1 * | 6/2020 | Byrne | ............. | G05B 19/41865 |
| 2020/0368876 A1 * | 11/2020 | Fukushima | ............. | B24B 29/00 |

FOREIGN PATENT DOCUMENTS

| | | | |
|---|---|---|---|
| CN | 103035159 B | 4/2013 | |
| CN | 105798884 A | 7/2016 | |
| CN | 205817837 U | 12/2016 | |
| DE | 3617681 A1 | 12/1987 | |
| DE | 19804006 A1 | 8/1998 | |
| DE | 10111529 A1 | 9/2002 | |
| DE | 102005022673 A1 | 11/2006 | |
| DE | 102006054934 A1 | 5/2008 | |
| DE | 102010038661 A1 | 2/2012 | |
| DE | 102013019098 B3 | 1/2015 | |
| DE | 112014001056 T5 | 12/2015 | |
| DE | 102016012227 A1 | 4/2017 | |
| DE | 102017201425 A1 | 8/2017 | |
| EP | 2644780 A2 | 10/2013 | |
| GB | 2243358 A * | 10/1991 | ............. E02F 3/963 |
| GB | 2533140 A | 6/2016 | |
| WO | 11003324 A1 | 1/2011 | |
| WO | 11012033 A1 | 2/2011 | |
| WO | 11160580 A1 | 12/2011 | |
| WO | 17108455 A1 | 6/2017 | |

(56) References Cited

FOREIGN PATENT DOCUMENTS

OTHER PUBLICATIONS

German Search Report issued in counterpart Patent Application No. 102019202827.6 dated Oct. 31, 2019 (10 pages).
Turret Test Systems, www.moog.com/products/turret-test systems. html, accessed Apr. 25, 2018, 2 pages.
U.S. Appl. No. 15/937,127 Office Action dated Nov. 18, 2019, 12 pages.
German Search Report issued in counterpart application No. 102019202577.3 dated Jul. 9, 2020 (10 pages).

* cited by examiner

CONTROLLING MOBILE MACHINES WITH A ROBOTIC ATTACHMENT

FIELD OF THE DESCRIPTION

The present description relates to controlling a mobile machine with a robotic attachment. More specifically, the present description relates to controlling a high precision robotic machine using a machine and robotic control system to perform a worksite operation.

BACKGROUND

There are many different types of work machines. Some such work machines include agricultural machines, construction machines, forestry machines, turf management machines, among others. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator.

Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others. Worksite operations may involve a large number of steps or phases and may be quite complex.

Robotic heads can also be attached to work machines in order to modify or incorporate additional functionality into the work machines. By way of example, in construction operations, a robotic head with an end effector in the form of a material dispenser can replace a bucket on an excavator. Once attached, the work machine can dispense material in accordance with a worksite operation.

The discussion above is merely provided for general background information and is not intended to be used as an aid in determining the scope of the claimed subject matter.

SUMMARY

A robotic machine includes at least one sensor coupled to the robotic machine configured to generate a signal indicative of a worksurface for which a worksurface operation is to be conducted. The robotic machine also includes a machine and robotic control system configured to receive the signal indicative of the worksurface, identify the worksurface operation to be conducted, and generate control signals for an end effector of the robotic machine to carry out the identified worksurface operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
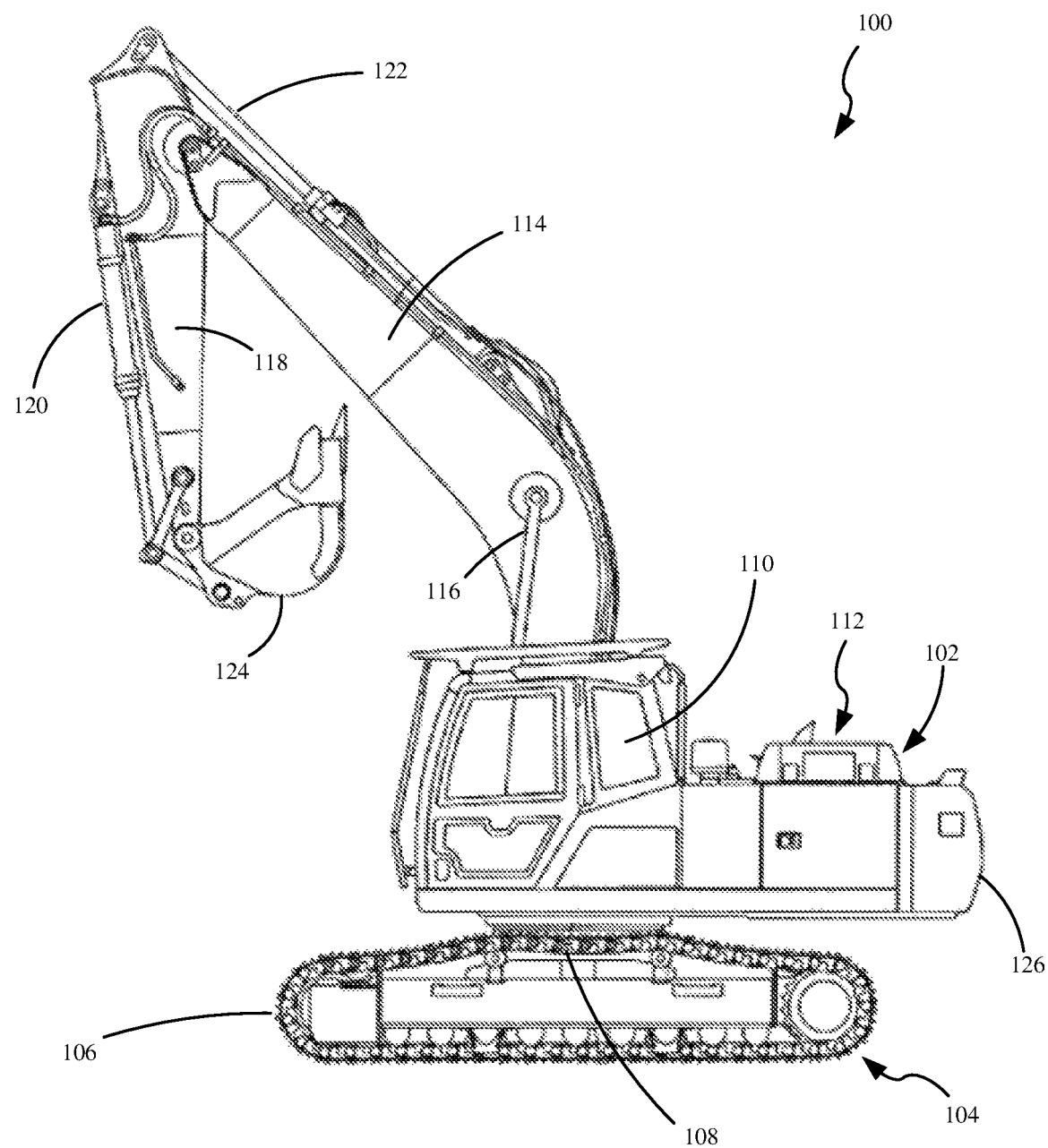
FIG. 1 is a pictorial illustration showing one example of a mobile machine with which a robotic attachment may be used.

In order to successfully complete a worksite operation, it may be necessary to convert a mobile machine into a high-precision robotic machine. Such worksite operations can include forestry operations, construction operations, agricultural operations, turf management operations, etc. Additionally, this may include a variety of mobile machines such as excavators, knuckle boom loaders, and other machines. For example, in a forestry operation, a robotic attachment can be attached to a mobile machine, such as an excavator or knuckle boom loader, and used for debarking, processing wood, felling, etc. However, a robotic attachment is often designed with an end effector that carries out a singular function within the context of a worksite operation. In one example, this may include an end effector in the form of a material dispenser that can be used to dispense material (such as mortar) in accordance with the worksite operation.

As an end effector is typically configured for a singular function, it may often be desired that a number of different robotic attachments are used to perform the worksite operation. Furthermore, controlling the end effector of the robotic machine is often a manual process that requires a user of a mobile machine to correctly position and control the end effector. However, this often leads to error as an operator has to precisely position and operate the end effector along a worksurface in order to successfully complete the worksite operation. For purposes of the present disclosure, a worksurface will be defined as an area within a worksite on which an operation is to be conducted.

Additionally, after a worksite operation is completed, it is often important that a robotic machine is stored correctly in a proper transport/storage position so as to avoid damage to the end effector and/or other components of the robotic attachment. To position a robotic machine at a transport/storage position, a user is often tasked with moving various linkages of a mobile machine to correctly position the robotic machine for storage. In one example, this includes positioning the robotic machine on a transport machine that transports the robotic machine to a different location.

The present description proceeds with respect to a machine and robotic control system that allows for automatic or semi-automatic control of a robotic attachment, that includes an end effector in the form of a tool-changer system, and/or a mobile machine. Additionally, the machine and robotic control system allows for control of the robotic attachment and/or mobile machine using a handheld controller, while also automatically or semi-automatically positioning the robotic machine and/or mobile machine in a transport/storage position after a worksite operation is completed. Furthermore, when a large load is anticipated or desired to be imparted on the robotic attachment, the machine and robotic control system can generate a control signal to rigidize or secure a number of stronger, more robust, adjustable length members on the robotic attachment to shunt the load from impacts that would otherwise be imparted on finer, lower strength, adjustable length members on the robotic attachment.

FIG. 1 is a pictorial illustration showing one example of a mobile machine with which a robotic attachment (shown in FIG. 2) may be used. While mobile machine 100 is illustratively shown as an excavator, it is to be understood that many other mobile machines may be used in accordance with the present description.

Mobile machine 100 illustratively includes a frame 102 pivotally mounted, via a swing pivot 108, to an undercarriage 104 with tracks 106. Mobile machine 100 includes a number of linkages (e.g. a movable portion positioned between two joints) that are controlled by a number of actuators. By way of example, this can include a boom 114 and/or an arm 118 controlled by electric or hydraulic actuators (e.g. cylinders 116, 120 and 122). As illustratively shown, frame 102 supports a cab 110, an engine assembly 112, a counterweight compartment 126, boom 114 movably coupled to frame 102, arm 118 attached to an end of boom 114, and a bucket 124 attached to an end of arm 118. In operation, a position of boom 114 relative to frame 102 is controlled by cylinder 116. A position of arm 118, relative to boom 114, is controlled by cylinder 122. Additionally, a position of bucket 124, relative to arm 118, is controlled by cylinder 120. An operator in cab 110 illustratively actuates user input mechanisms to control cylinders 116, 120 and 122 as well as to control other actuators (such as to swing cab 110, to move and steer machine 100, etc.)

Figure 2:
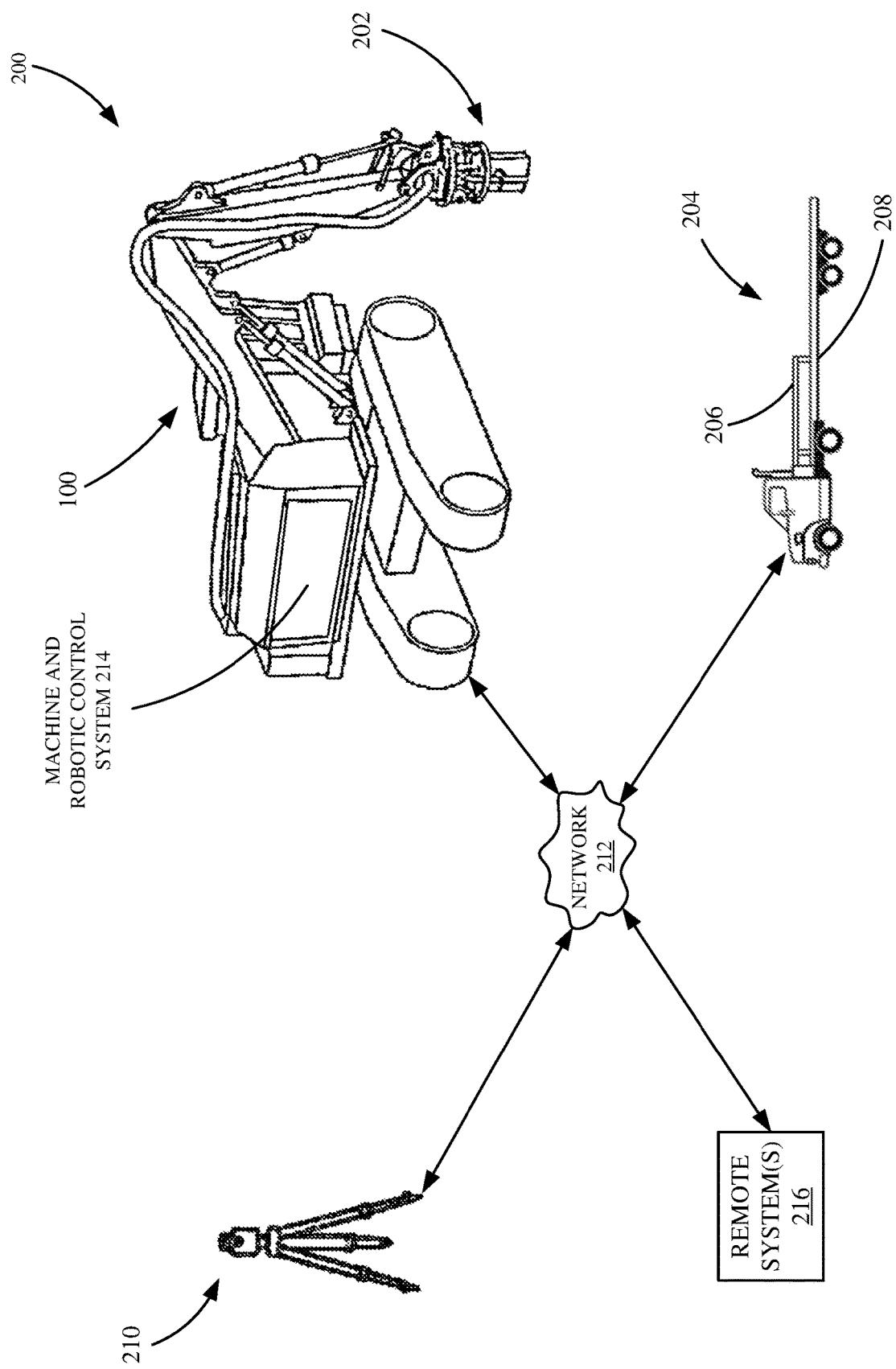
FIG. 2 is pictorial illustration showing a robotic machine architecture in which a robotic machine, with a machine and robotic control system, is coupled to an external sensor system, a remote system and a transport machine.

FIG. 2 is pictorial illustration showing a robotic machine architecture in which a robotic machine 200, with a machine and robotic control system 214, is coupled to an external sensor system 210, a remote system 216 and a transport machine 204 over network 212. As illustratively shown, robotic machine 200 includes mobile machine 100 coupled to a robotic attachment 202. While robotic machine 200 is coupled to external sensor system 210, remote system 216 and transport machine 204, it is contemplated that, in some examples, robotic machine 200 may be coupled to a subset of these systems and/or machines, or, alternatively, additional systems and/or machines. Remote system(s) 216 can include a wide variety of different remote systems (or a plurality of remote systems) including a remote computing system accessible by the other items in FIG. 2 (e.g., by robotic machine 200, external sensor system 210, and/or transport machine 204). Network 212 can be any of a wide variety of different types of networks, such as a wide area network, a local area network, a near field communication network, a cellular network, or any of a wide variety of other wired or wireless networks or combinations of networks. Additionally, transport machine 204 can be a wide variety of different transport machines configured to transport and/or store robotic machine 200. In one example, transport machine 204 can include a trailer 208, with cradles 206, for storing robotic machine 200 during transport.

In operation, upon coupling robotic attachment 202 to mobile machine 100, machine and robotic control system 214 can automatically or semi-automatically control robotic machine 200. In one example, this includes generating control signals for an end effector of robotic attachment 202 to carry out an identified worksurface operation which can include a construction operation, forestry operation, etc. Additionally, this may include controlling various actuators on mobile machine 100 and/or robotic attachment 202 to position robotic machine 200 at a transport/storage position on transport machine 204. In other examples, machine and robotic control system 214 can control robotic attachment 202 based on a received user input through a handheld controller, or other user interface device. This will be discussed further with respect to FIG. 7.

It will be noted that, in one example, mobile machine 100 and/or robotic attachment 202 may have their own machine and robotic control system 214 which can communicate with one or more remote systems 216 and/or external sensor system 210. Additionally, parts of machine and robotic control system 214 can be disposed on mobile machine 100, on robotic attachment 202 and/or a central system. For purposes of the present discussion, it will be assumed that machine and robotic control system 214 is a system on mobile machine 100 that controls robotic machine 200 as will be discussed further, again with respect to FIG. 7.

Figure 3:
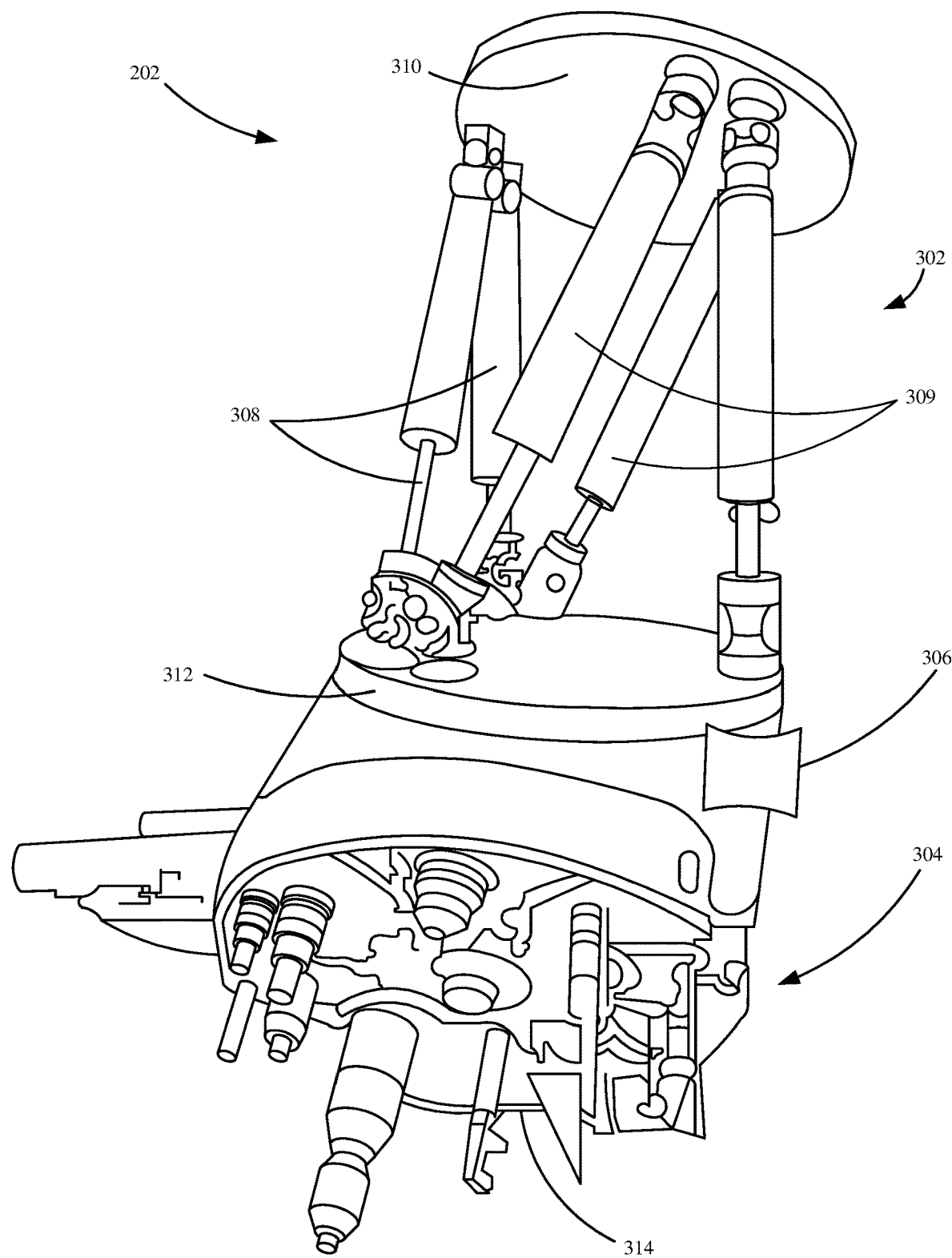
FIG. 3 is a pictorial illustration showing a robotic attachment illustrated in FIG. 2 in more detail.

FIG. 3 is a pictorial illustration showing one example of robotic attachment 202 illustrated in FIG. 2 in more detail. As illustratively shown, robotic attachment 202 includes a Stewart platform 302, sensor(s) 306 and an end effector 304 with a tool changer system 314. In one example, Stewart platform 302 is a robotic platform with multiple strong, robust hydraulic or electric cylinders 308 and fine, low strength hydraulic or electric cylinders 309 between a platform base 310 and a platform table 312. In operation, cylinders 308 can float while cylinders 309 can drive precise movements of end effector 304. However, when a load or impact is imparted on attachment 202 (either unexpectedly or expectedly, as part of an operation), machine and robotic control system 214 can generate control signals to lock the stronger hydraulic and/or electric cylinders 308 in place while the finer, lower strength cylinders 309 are allowed to float between platform base 310 and platform table 312. By locking cylinders 308, the impact can be shunted using cylinders 308 and corresponding actuators thereby protecting the smaller, higher precision cylinders 309 and/or actuators. While robotic attachment 202 includes Stewart platform 302, with multiple cylinders 308, 309, and end effector 304, and with tool changer system 314, it is expressly contemplated that other types of robotic attachments 202 can be used in accordance with the present description, depending on a worksite operation. In operation, Stewart platform 302 allows for end effector 304 to be moved in multiple degrees of freedom.

Sensor(s) 306 can include a wide variety of sensors which may include cameras and other optical/vision sensors, distance measurement sensor(s), etc. In operation, sensor signals can be generated and provided to machine and robotic control system 214 in order to generate control signals for end effector 304, other components of robotic attachment 202 and/or mobile machine 100. This will be discussed further with respect to FIG. 7. Briefly, however, sensor(s) 306 can include one or more optical sensors that generate signals indicative of a worksurface for which a worksite operation is to be conducted. The sensor signals can be provided to machine and robotic control system 214 and used to identify the worksurface, and, based on the identified worksurface, identify a worksurface operation that end effector 304 is to perform. End effector 304 can then be controlled autonomously through machine and robotic control system 214 to perform that operation.

Figure 4A:
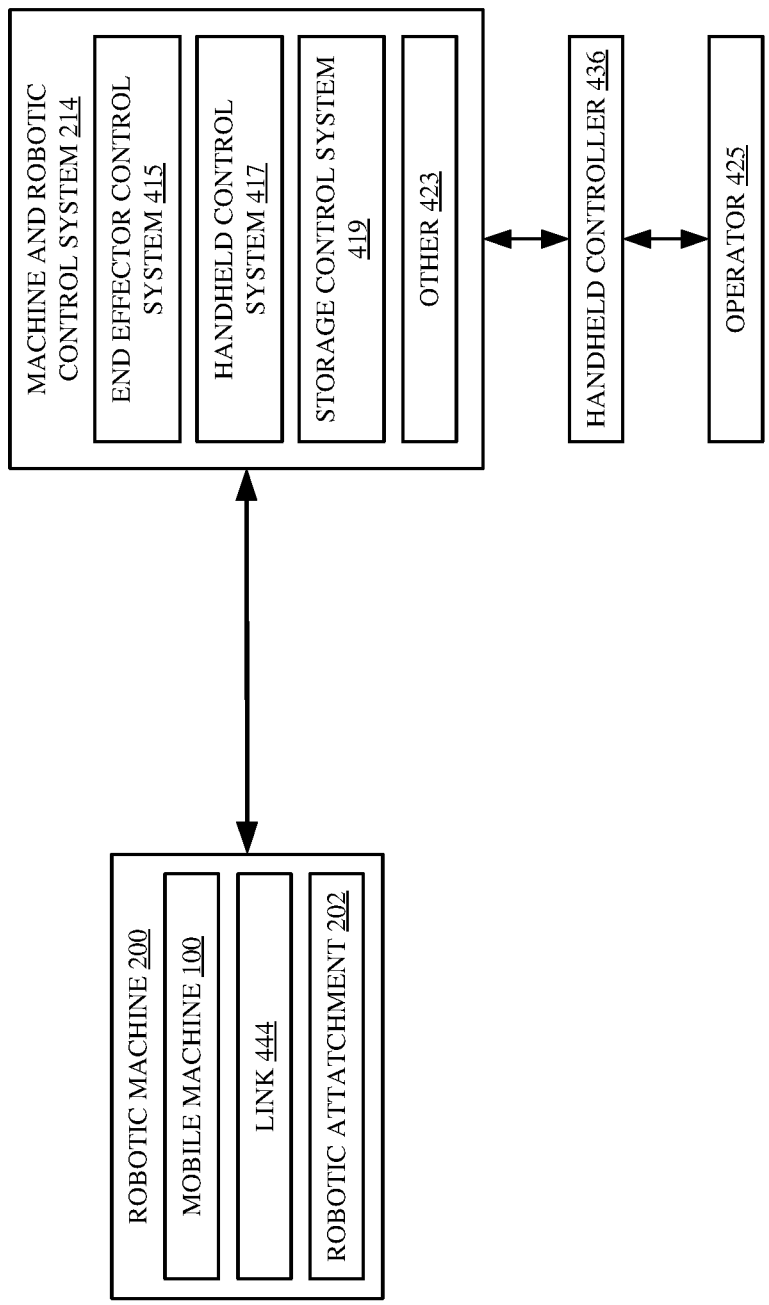
FIG. 4A is a block diagram of a robotic machine coupled to a machine and robotic control system.

FIG. 4A is a block diagram of robotic machine 200 coupled to machine and robotic control system 214. As illustratively shown, robotic machine 200 includes mobile machine 100 coupled to robotic attachment 202 through a link 444. In operation, machine and robotic control system 214 can be used to generate control signals for a variety of subsystems of machine 200. Machine and robotic control system 214 illustratively includes end effector control system 415, handheld control system 417, storage control system 419, among a variety of other systems 423.

In operation, end effector control system 415 can generate control signals for end effector 304 and actuator(s) on mobile machine 100 and robotic attachment 202, respectively, based on an identified worksurface operation. In one example, end effector control system 415 can autonomously or semi-autonomously carry out the identified worksurface operation as will be discussed with respect to FIGS. 6 and 7. Additionally, handheld control system 417 allows an operator 425 to control robotic machine 200 through a handheld controller 436. For example, upon receiving an operator input through handheld controller 436, handheld control system 417 will identify a control signal based on the input and will generate the control signal for the subsystem of machine 200. Furthermore, after a worksite operation is completed, storage control system 419 can autonomously or semi-autonomously generate control signals for the actuator(s) and/or steering and propulsion system of machine 200 to position machine 200 at a storage/transport position. This will be discussed further with respect to FIG. 7.

Figure 4B:
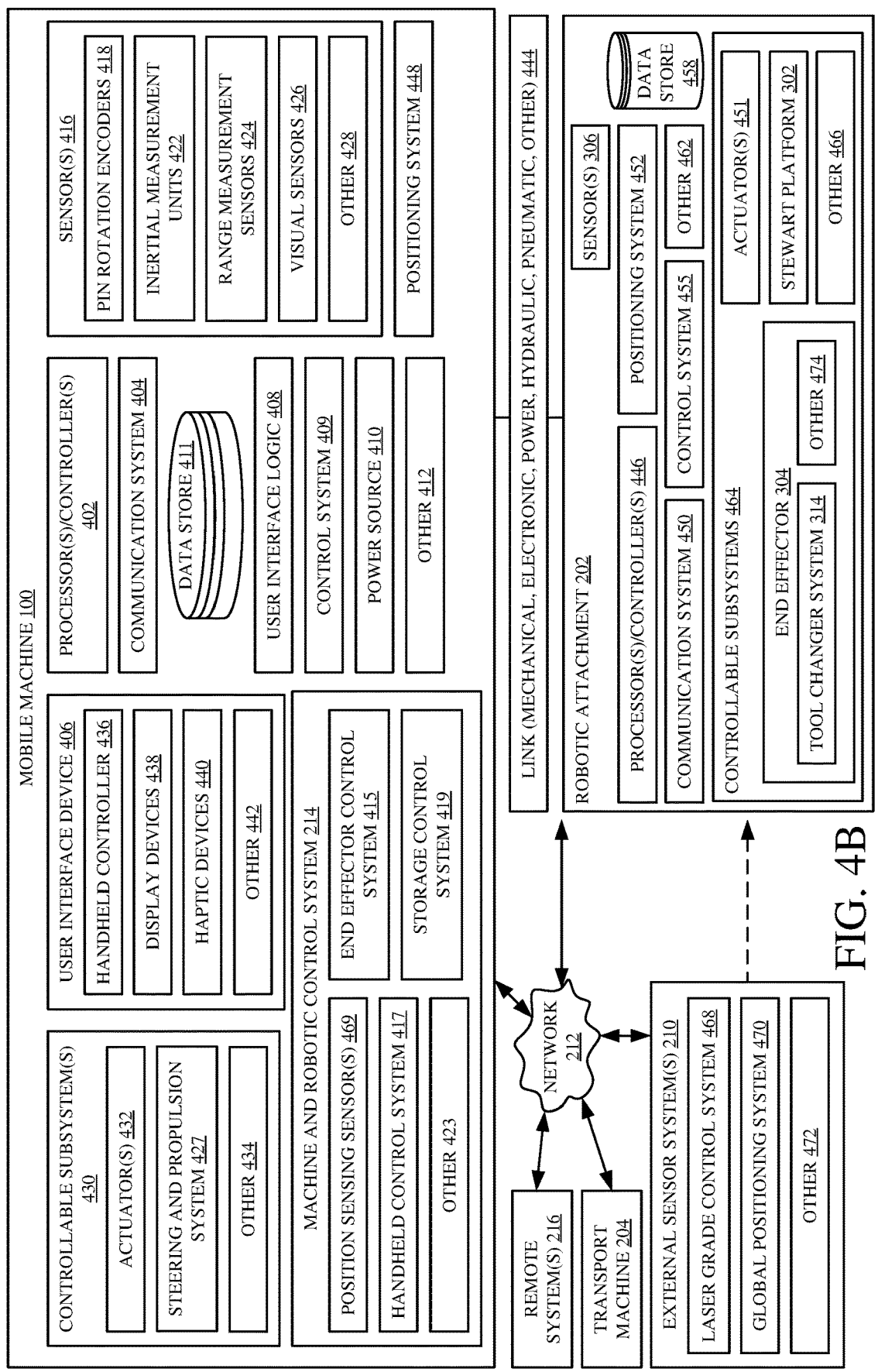
FIG. 4B is a block diagram of a robotic machine which includes a mobile machine coupled to a robotic attachment through a link.

FIG. 4B is a block diagram of robotic machine 200 which includes mobile machine 100 coupled to robotic attachment 202 via a link 444, in more detail. Additionally, as illustratively shown, mobile machine 100, robotic attachment 202, external sensor system 210 and remote system(s) 216 are communicatively coupled over network 212.

Mobile machine 100 illustratively includes processor(s)/controller(s) 402, controllable subsystem(s) 430, machine and robotic control system 214, a communication system 404, a user interface device 406, a power source 410, a data store 411, user interface logic 408, positioning system 448, control system 409, sensor(s) 416, and a wide variety of other items 412. Before describing the operation of robotic attachment 202 and machine and robotic control system 214 in more detail, a brief description of some of the items in mobile machine 100, and their operation, will first be provided.

Control system 409 can generate control signals for controlling a variety of different controllable subsystem(s) 430, which may include actuator(s) 432, steering and propulsion system 427, or other subsystems 434, based on sensor signals generated by sensor(s) 416, based on feedback received from remote system(s) 216 and/or machine and robotic control system 214, based on operator inputs received through user interface device 406 within cab 110, or it can generate control signals in a wide variety of other ways as well. Other subsystems 434 can include a wide variety of mechanical, electrical, hydraulic, pneumatic, computer implemented and other systems that relate to the movement of mobile machine 100, the operation that is performed, and other controllable features. Actuator(s) 432 can include a wide variety of different types of actuator(s) configured to receive a control signal and drive linkage motion on mobile machine 100 and/or other movement of mobile machine 100 which may include movement of boom 114, arm 118, frame 102 and/or an end effector such as bucket 124, among a variety of other linkages and components. They can also be used to drive positioning of robotic attachment (or robotic head) 202. Actuator(s) 432 can include motor(s), control valve(s), pump control(s), hydraulic actuator(s), electric linear actuator(s), among a variety of other actuator(s).

Communication system 404 can include one or more communication systems that allow components of mobile machine 100 to communicate with each other (such as over a controller-area-network (CAN) bus or otherwise) while also allowing mobile machine 100 to communicate with remote system(s) 216, external sensor system(s) 210, transport machine 204 and/or robotic attachment 202 over network 212.

User interface device 406 can include a handheld controller 436, display devices 438, haptic devices 440 and a variety of other devices such as mechanical or electrical devices (e.g., a steering wheel, joysticks, pedals, levers, buttons, etc.), audio devices, etc. In one example, user interface logic 408 generates an operator display on user interface device 406 which can include a display device that is integrated into operator compartment 110 of mobile machine 100, or it can be a separate display on a separate device that can be carried by an operator (such as a laptop computer, a mobile device, etc.). In operation, handheld controller 436 can be used to control a variety of components within mobile machine 100 and/or robotic attachment 202. For example, a user input can be received through handheld controller 436 and machine and robotic control system 214 can generate control signals based on the received user input. This will be discussed further with respect to FIG. 5.

Power source 410 can be a wide variety of power sources configured to supply power to various components and subsystems within mobile machine 100 and/or robotic attachment 202. Power source 410 can include an engine, a battery, generators, alternators, etc. In operation, power source 410 can be used to provide electrical, mechanical, hydraulic or other power to various components within robotic attachment 202 via link 444.

Data store 411 can store any or all data pertaining to an operation of mobile machine 100 and/or robotic attachment 202. In one example, data store 411 can include transport/storage positioning information for mobile machine 100 and robotic attachment 202, which, in one example, includes dimensional information for positioning linkages of mobile machine 100 and robotic attachment 202 in a transport/storage position. Additionally, transport/storage information can include various control signal information defining control signals that can be generated to position robotic machine 200 in the storage/transport position. In one example, transport/storage positioning information can be based on a type of robotic attachment 202, transport machine 204 and mobile machine 100. In operation, machine and robotic control system 214 can access the transport/storage positioning information and can control various actuator(s) of mobile machine 100 and robotic attachment 202 to position various linkages at their respective transport/storage positions based on the storage/transport information. In one example, transport and storage positioning information may be provided to data store 411 via a user input (such as by manually controlling machine 100 and attachment 202 to move them to their transport/storage position and providing a user input indicating this, so the position can be stored, or obtained from remote system(s) 216.

Data store 411 may also include worksurface operational information for end effector 304 of robotic attachment 202. For example, tool changer system 314 may include a large variety of tools configured to carry out a number of worksurface operations. In this example, worksurface operational information can include information defining how to control each tool, categorized based on a worksurface operation it performs. Additionally, worksurface operational information can include a variety of worksurface operations categorized based on a type of worksurface. In operation, machine and robotic control system 214 can identify a worksurface operation, from received sensor signals and worksurface operational information, and can identify a number of tools that will be used in performing the identified worksurface operation. System 214 can also obtain tool path information for each tool, an operating order (or sequence) for the tools indicating what order the tools will be used in, durational information indicating how long each tool will be used, etc. Based on the received worksurface operational information, machine and robotic control system 214 can control tool changer system 314 to carry out the identified worksurface operation.

For example, for an identified tuck-pointing operation, worksurface operational information can indicate that the steps include removing old mortar, washing out a joint, applying new mortar, striking the new mortar, brushing down the mortar and acid washing the brick faces. Additionally, the worksurface operational information can indicate that the tuck-pointing operation includes using a variety of tools of an end effector such as a chisel, a saw, a vacuum, a water source, a mortar source, a striking knife, a brush, a liquid source, etc. to complete the tuck-pointing operation. This is discussed in greater detail below with respect to FIG. 9. While worksurface operational information includes information for a tuck-pointing operation, information for a variety of other worksurface operations can be stored as well.

Data store 411 can also include handheld control information that, in one example, maps a user input from a handheld controller to an operational/positional change within mobile machine 100 or robotic attachment 202. For example, handheld control information can include control maps that map user input mechanisms, on handheld controller 436, to control outputs that control actuators that move linkages or other items of mobile machine 100. This will be discussed further with respect to FIGS. 5 and 7.

Sensor(s) 416 generate sensor signals which can be used by machine and robotic control system 214 to control mobile machine 100 and robotic attachment 202. Sensor(s) 416 can include pin rotation encoders 418, inertial measurement units 422, range measurement sensors 424, visual sensors 426, position sensing sensors 469, among a variety of other sensors 428. Inertial measurement units 422 can include accelerometer(s), gyroscopes, magnetometer(s), among a variety of other sensors. Range measurement sensors 424 can be radar-based sensors, LIDAR-based sensors, ultra-wideband radiation sensors, ultrasonic radiation sensors, among a variety of other sensors.

In one example, sensor signal(s) can be received by machine and robotic control system 214 and used to identify a current position of linkages of mobile machine 100 and robotic attachment 202. Based on accessed transport/storage position information and the current position, machine and robotic control system 214 can identify a path for each of the linkages that will position the linkages of mobile machine 100 and robotic attachment 202 at the transport/storage position. This may include moving mobile machine 100 and robotic attachment 202 onto a transport machine.

Additionally, the sensor signal(s) can also provide an indication or characteristic of a worksurface on which a worksurface operation is to be conducted. This is discussed in greater detail below with respect to FIGS. 6 and 7.

Positioning system 448 can include one or more of a global positioning system (GPS) receiver, a LORAN system, a dead reckoning system, a cellular triangulation system, or other positioning system that identifies a position of mobile machine 100 and/or robotic attachment 202, or individual parts of them. This may include x-axis, y-axis and z-axis coordinate information relative to a known coordinate system, a geographic position, or a system that derives a position of robotic attachment 202 from a known position of mobile machine 100, as examples.

Machine and robotic control system 214 is configured to control mobile machine 100 and robotic attachment 202 in a variety of ways. In one example, machine and robotic control system 214 can generate control signals that control end effector 304 to carry out a worksurface operation. The control signals can control actuator(s) 432 to position various linkages of mobile machine 100, or mobile machine 100 itself, at a transport/storage position. Additionally, machine and robotic control system 214 can generate control signals based on received user inputs from handheld controller 436 as will be discussed later. In other examples, machine and robotic control system 214 can stabilize a variety of actuator(s) that, in one example, control cylinder(s) 308 to make them rigid so that they shunt impacts imparted on attachment 202 from more sensitive actuators 309 on attachment 202.

Mobile machine 100 can be coupled to robotic attachment 202 via one or more links 444. Links 444 can include a mechanical linkage so that robotic attachment 202 is physically coupled to mobile machine 100. It can also include other links (such as a cable harness, wireless links, etc.) for transmitting electronic data, power, hydraulic fluid under pressure, pneumatic power, or a wide variety of other things.

Now turning to robotic attachment 202, robotic attachment 202 illustratively includes processor(s)/controller(s) 446, a communication system 450, a positioning system 452, control system 455, data store 458, actuators 308 and 309, sensor(s) 306, controllable subsystems 464, among a variety of other components 462. A brief description of some of the items in robotic attachment 202, and their operation, will now be provided.

Control system 455 of robotic attachment 202 can generate control signals for controlling a variety of different controllable subsystems 464, which, in one example, can include actuators 308 and 309 that move end effector 304 and/or Stewart platform 302. Controllable subsystem(s) 464 can include actuator(s) 451 and a wide variety of other mechanical, electrical, hydraulic, pneumatic, computer implemented and other systems 466 of robotic attachment 202 that relate to the movement of robotic attachment 202, the operation that is performed, and other controllable features. Actuator(s) 451 can drive linkage movement of robotic attachment 202 and may include similar or different actuator(s) than actuator(s) 432 on mobile machine 100. Control system 455 can generate control signals based on received sensor signals, based on feedback received from mobile machine 100, remote system(s) 216, external sensor system(s) 210, machine and robotic control system 214, based on operator inputs received through user interface device 454, or it can generate control signals in a wide variety of other ways as well.

Communication system 450 can include one or more communication systems that allow components of robotic attachment 202 to be communicatively coupled to each other while also allowing robotic attachment 202 to be communicatively coupled to mobile machine 100. In other examples, communication system 450 allows robotic attachment 202 to communicate with mobile machine 100, external sensor system(s) 210 and/or remote system(s) 216 over network 212. Positioning system 452 can include one or more of a global positioning system (GPS) receiver, a LORAN system, a dead reckoning system, a cellular triangulation system, or other positioning system that enables machine and robotic control system 214 to identify a location of mobile machine 100 and/or robotic attachment 202. This may include x-axis, y-axis and z-axis coordinate information in a known coordinate system or a geographic position. Additionally, in one example, machine and robotic control system 214 can drive a position of attachment 202 by determining an offset between mobile machine 100 and robotic attachment 202 using the received information from positioning system 452.

Data store 458 can store any or all data pertaining to operation of robotic attachment 202 and/or data pertaining to mobile machine 100. This may be similar to, or different than, the data stored within data store 411. Additionally, data within data store 458 may be indexed based on a particular type of mobile machine 100 that attachment 202 is connected to, based on the type of robotic attachment 202, based on the type of transport machine 204, or the type of worksurface operation, etc. In operation, data within data store 458 can be used by machine and robotic control system 214 to control mobile machine 100 and robotic attachment 202 as will be discussed later.

Sensor(s) 306 can include a wide variety of different sensors which may be optical devices, various image sensors and image processing components, distance measuring sensor(s), vision sensor(s), among a variety of other sensor(s). Sensor(s) 306 can be positioned on various components of robotic attachment 202 which may include end effector 304 and/or Stewart platform 302. In one example of a worksurface operation, an operator can provide an input identifying what worksurface operation is to be performed. In another example, machine and robotic control system 214 can receive sensor signals from sensor(s) 306 and can identify a worksurface operation based on the received sensor signals. This may include receiving sensor signals from a vision sensor coupled to end effector 304, and through signal analysis, determining a worksurface operation to be performed on a worksurface adjacent to, or facing, end effector 304. Based on the identified worksurface operation, machine and robotic control system 214 can generate control signals to control end effector 304 to carry out the identified worksurface operation. Additionally, sensor signal(s) from sensor(s) 306 can also be used in positioning robotic machine 200 at a transport/storage position by allowing machine and robotic control system 214 to determine a current position of linkages of mobile machine 100 and robotic attachment 202. Sensor signals can be used in a variety of other ways as well.

Turning to external sensor system(s) 210, external sensor system(s) 210 are configured to provide positional information indicating a position of robotic attachment 202 to machine and robotic control system 214. External sensor system(s) 210 can include a laser system (or other optical or image-based system) 468, a global positioning system 470 with real time kinematic functionality, among a wide variety of other systems 472. In one example, laser system 468 can include the use of cameras, infrared radiation, LIDAR, total stations with prisms, and other similar devices. In operation, positional information generated from external sensor system(s) 210 are received by machine and robotic control system 214 and used to determine a current position of robotic attachment 202 so that the system 214 can learn how to control robotic attachment 202.

Figure 5:
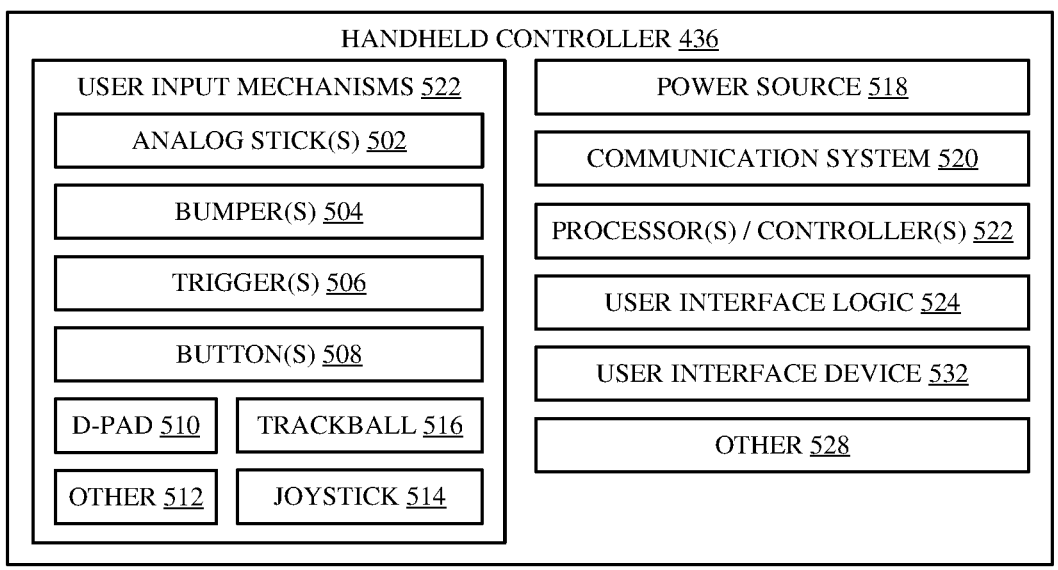
FIG. 5 is a block diagram of a handheld controller that may be used to control a robotic machine using a machine and robotic control system.

FIG. 5 is a block diagram of handheld controller 436 that may be used to control robotic attachment 202 and mobile machine 100 using machine and robotic control system 214. Handheld controller 436 illustratively includes user input mechanisms 522, power source 518, communication system 520, processor(s)/controller(s) 522, user interface logic 524, user interface device 532, among a variety of other components 528. In operation, an operator can provide a user input through user input mechanisms 522 to control a variety of subcomponents of robotic attachment 202 and mobile machine 100 using machine and robotic control system 214. For example, upon receiving a user input via user input mechanisms 522, communication system 520 can then communicate that user input to machine and robotic control system 214. System 214 can then access a map that maps the received user input to a control signal for a controllable subsystem on mobile machine 100 or robotic attachment 202. Machine and robotic control system 214 then generates the control signal to control an actuator or other subcomponent of mobile machine 100 or robotic attachment 202 based on the user input. This will be discussed in detail with respect to FIG. 7.

However, one operation using handheld controller 436 to control end effector 304 of robotic attachment 202 will now be discussed for the sake of example. In this example, handheld controller 436 includes a left analog stick 502, a right analog stick 502, left bumpers 504 (with an upper, left bumper and lower, left bumper), buttons 508, and right bumpers 504 (with an upper, right bumper and lower, right bumper). In operation, sensor(s) 306 can include a camera(s) on end effector 304 configured to provide signals, indicative of a near real-time visual feed showing a worksurface facing end effector 304, to display device 438 within operator cab 110. While viewing the generated display, an operator of robotic machine 200 can provide user inputs, through user input mechanisms 522, to machine and robotic control system 214 to modify a position of end effector 304 and to control operation of a tool carried by end effector 304. For example, each of user input mechanisms 522 can be mapped to specific actuator(s) 432 that, upon receiving a control signal, will drive a positional change of end effector 304 or control its operation of an attached tool. The mappings can be stored in a control map in data stores 411, 458 and/or remote system(s) 216.

The control map can thus indicate a relationship between a received user input, via a user input mechanism 522, such as analog stick 502, and an actuator control signal. For example, left analog stick 502 can be mapped to a specific actuator 432 that will drive movement of end effector 304 along a z-axis and x-axis. Additionally, right analog stick 502 can be mapped to a specific actuator 432 that will drive rotational movement of end effector 304 about an x-axis and y-axis. Upper and lower left bumpers 504 can be mapped to a specific actuator 432 that will drive movement of end effector 304 along a y-axis, and upper and lower right bumpers 504 can be mapped to a specific actuator 432 that will drive rotation of end effector 304 about the z-axis. However, while a user-input mechanism is mapped to a specific actuator 432 that drives movement of end effector 304, it is also contemplated that a user-input mechanism can be mapped to a plurality of actuator(s) 432 that drive positional movement of end effector 304 and its operation of a tool (such as turning it on and off, controlling its speed, etc.).

Buttons 508 (or other user input mechanisms) on handheld controller 436 can be used to actuate various functions of end effector 304. For example, pressing a button 508 on handheld controller 436 may actuate a tool on tool changer system 314. It is also contemplated that analog sticks 502, or other user input mechanisms 522, may have multiple levels of sensitivity that can be changed using machine and robotic control system 214. In one example, a lowest sensitivity setting can indicate a slower positional change for end effector 304, given a user input. Additionally, middle sensitivity settings can involve controlling both actuator(s) 432 of mobile machine 100 and robotic attachment 202 to change positions more quickly than the lowest sensitivity given the user input. A maximum level of sensitivity can be used to drive a highest rate of movement of actuator(s) 432 given the user input.

Furthermore, user inputs may be received continuously, in a pulsed manner, or sporadically. In one example, user inputs received continuously may be mapped as velocity commands, pulsed inputs may indicate incremental changes in a position of end effector 304, and sporadic inputs may be determined to be indicative of a singular positional change. However, this is but an example only. In other examples, user input mechanisms 522 can be mapped to a variety of other controllable subsystems within mobile machine 100 and robotic attachment 202 beyond actuator(s) 432.

Communication system 520 can include one or more communication systems that allow components of handheld controller 436 to be communicatively coupled to each other while also allowing handheld controller 436 to be communicatively coupled to machine and robotic control system 214. In one example, communication system 520 includes a near field communication system that allows handheld controller 436 to communicate with machine and robotic control system 214 wirelessly. However, other communication systems can be used as well. Additionally, handheld controller 436 can be wired to machine and robotic control system 214 as well.

Power source 518 is configured to supply power to any or all components within handheld controller 436. In one example, handheld controller 436 can be wirelessly connected to machine and robotic control system 214. In this example, power source 518 can include batteries or other power sources. However, it is also contemplated that handheld controller 436 may receive power from mobile machine 100.

User interface logic 524 is configured to receive a signal from machine and robotic control system 214 and generate a control signal for, in one example, user interface devices 532. User interface devices 532 can include display devices, speakers (or other audible devices), vibrational components (or other haptic devices), lights, etc. within handheld controller 436. In one example, upon receiving various user inputs through user input mechanisms 522, machine and robotic control system 214 may generate a signal for user interface logic 524 to generate a display on user interface device 532.

Figure 6:
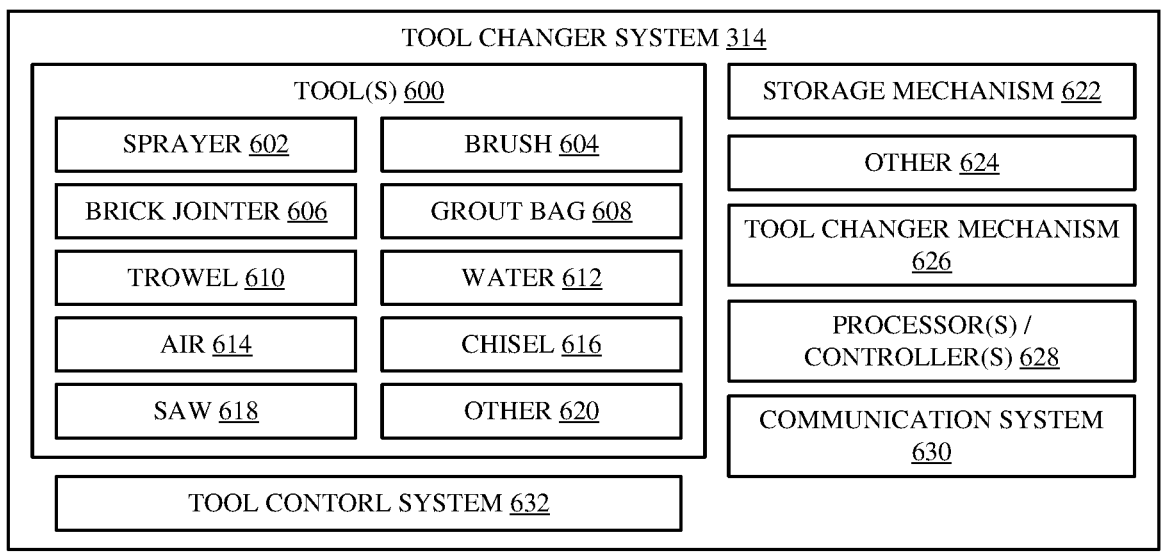
FIG. 6 is a block diagram of a tool changer system that may be used to carry out a worksurface operation using a machine and robotic control system.

FIG. 6 is a block diagram of tool changer system 314 that may be used to carry out a worksurface operation using machine and robotic control system 214. In one example, end effector 304 includes tool changer system 314 with processor(s)/controller(s) 628, a communication system 630, tool(s) 600, a storage mechanism 622, a tool changer mechanism 626, and a tool control system 632 among a variety of other systems and components 624. In operation, tool changer system 314 receives signals from machine and robotic control system 214 and carries out an identified worksurface operation as will be discussed further with respect to FIG. 7. Communication system 630 can include one or more communication systems that allow components of tool changer system 314 to be communicatively coupled to each other while also allowing tool changer system 314 to be communicatively coupled to machine and robotic control system 214.

In the example shown in FIG. 6, tools(s) 600 illustratively include a sprayer 602, a brick jointer 606, a trowel 610, an air source 614, a saw 618, a brush 604, a grout bag 608, a water source 612, and a chisel 616 among a variety of other tools 620. Tool(s) 600 can be used to carry out an identified worksurface operation such as a tuck-pointing operation. In other examples, the tools 600 are those appropriate to other operations such as planting operations, demolition operations, etc. Additionally, storage mechanism 622 can include a variety of storage mechanisms to store tool(s) 600. In one example, storage mechanism 622 can include individual storage compartments for tool(s) 600.

In operation, upon receiving a signal from machine and robotic control system 214, tool changer mechanism 626 can select a particular tool 600, from storage mechanism 622, in order to perform a corresponding tool operation which may be part of a worksurface operation. Once selected, a signal from machine and robotic control system 214 can be provided to tool control system 632 to operate the selected tool over an identified tool path as determined by machine and robotic control system 214. After operating the tool along the tool path, machine and robotic control system 214 can control tool changer mechanism 626 to return the selected tool to the holder in storage mechanism 622 and select a different tool 600, from storage mechanism 622, and generate signals to operate that tool on a different or same portion of the worksurface. This will be also discussed further with respect to FIG. 7.

Figure 7:
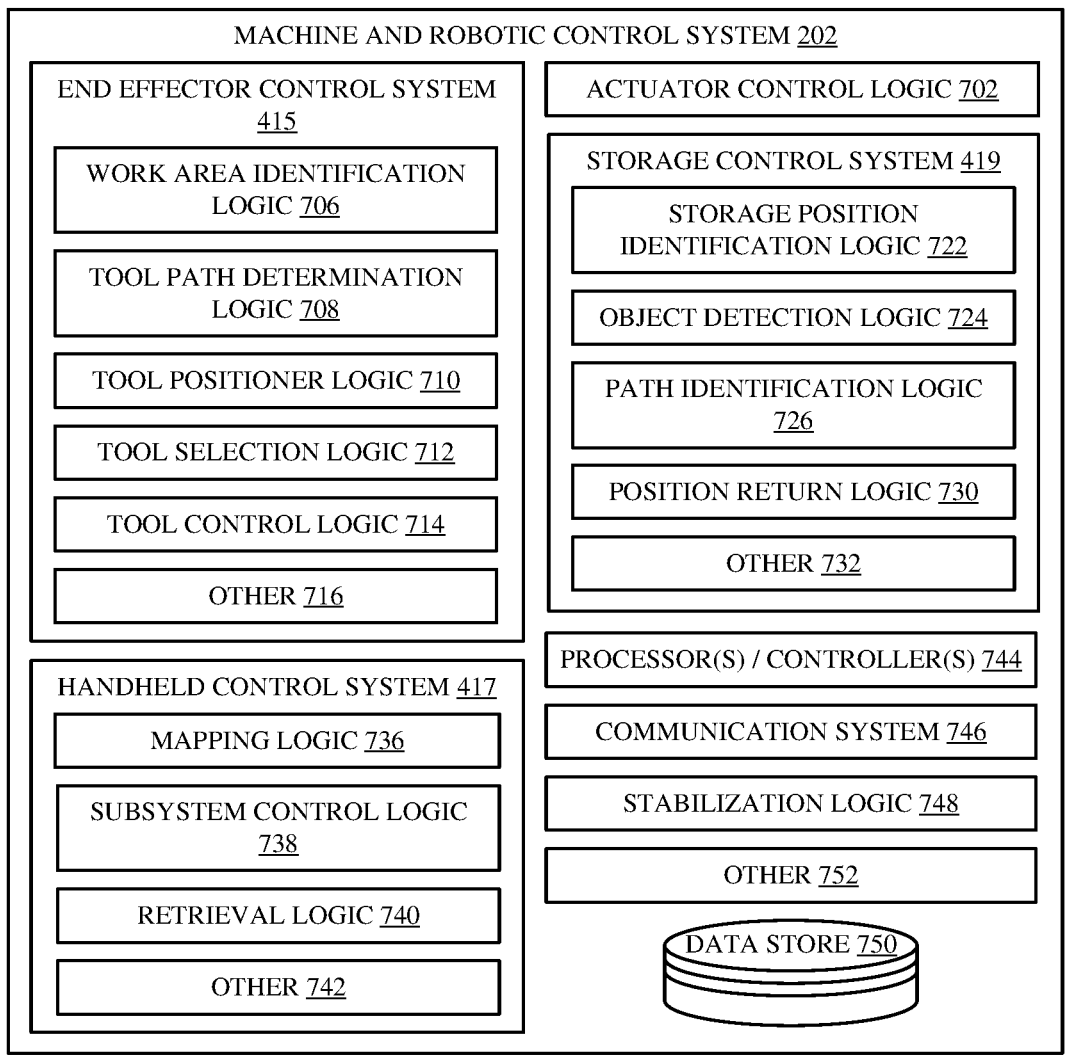
FIG. 7 is a block diagram of a machine and robotic control system that may be used to control a robotic machine.

FIG. 7 is a block diagram of machine and robotic control system 214 that may be used to control robotic machine 200. Machine and robotic control system 202 illustratively includes processor(s)/controller(s) 744, a communication system 746, data store 750, actuator control logic 702, an end effector control system 415, a handheld control system 417, a storage control system 419, stabilization logic 748, and it can include a variety of other systems and components 752. Actuator control logic 702 generates control signal(s) for actuator(s) 432 of mobile machine 100 and robotic attachment 202 based on signals provided from end effector control system 415, handheld control system 417, storage control system 419, stabilization logic 748, etc.

Data store 750 can store any or all data pertaining to an operation and/or position of robotic attachment 202 and/or mobile machine 100. This may be similar to, or different than, the data stored within data stores 411 and 458. Communication system 746 can include one or more communication systems that allow components of machine and robotic control system 202 to be communicatively coupled to each other while also allowing the components to be communicatively coupled to mobile machine 100, robotic attachment 202, remote system(s) 216, transport machine 204 and/or external sensor system(s) 210.

End effector control system 415 is configured to identify a worksurface operation to be performed based on received sensor signals or based on an operator input or otherwise. Then, based on the identified worksurface operation, system 415 controls tool changer system 314 to select the tools used to perform the worksurface operation. End effector control system 415 includes work area identification logic 706, tool path determination logic 708, tool positioner logic 710, tool selection logic 712, tool control logic 716 and it can include a variety of other systems and components 716.

In operation, by way of overview, work area identification logic 706 receives sensor signals from sensor(s) 306 and 416 indicative of characteristics of a worksurface. In one example, sensor(s) 306 can include a camera, stereo cameras, or other visual sensors on end effector 304 configured to generate signals indicative of a location and condition of a worksurface adjacent to end effector 304. Based on the received sensor signals, work area identification logic 706 can identify the worksurface and a worksurface operation. For example, work area identification logic 706 can utilize image processing techniques to identify the worksurface. In this example, an image analysis of the worksurface can indicate that the worksurface includes a brick wall. Once identified, work area identification logic 706 can access and utilize worksurface information from any or all data stores 411, 458 and 750 to identify the worksurface operation to be performed, or where on the worksurface the operation is to be performed. In one example, the worksurface operation to be performed is a tuck-pointing operation for the brick wall. However, in other examples, a worksurface operation may be identified by a user input. Upon identifying the worksurface operation for the worksurface, work area identification logic 706 generates an output for tool path determination logic 708 indicative of a location of the identified worksurface.

Tool path determination logic 708, in response to the output from work area identification logic 706, identifies which tools to use to perform the worksite operation, the order or sequence in which those tools are used, and determines a tool path for each of the tools in order to complete the worksurface operation. In one example, this includes obtaining end effector control information from data store(s) 411, 458 and 750 and/or remote system(s) 216 and determining, based on that control information, which tools are used to complete the worksurface operation. Upon determining which tools are used, the sequence of tools, and the tool paths they are to follow, tool path determination logic 708 provides an output to tool selection logic 712, tool positioner logic 710 and tool control logic 714 indictive of the tools to use, the order they are to be used in, and tool paths they are to follow.

Tool selection logic 712, upon receiving an indication from tool path determination logic 708, generates a control signal for tool changer mechanism 626 to select a tool to perform a corresponding tool operation in order to perform the overall worksurface operation. Upon receiving the control signal, tool changer mechanism 626 can select a particular tool within storage mechanism 622.

Tool positioner logic 710 can receive the output from tool path determination logic 708 and determine whether the selected tool is in a correct position relative to the identified tool path. In one example, this includes receiving sensor signals from one or more sensor(s) 306, 416 to determine whether the selected tool is at a correct position. For example, sensor(s) 306 can include distance measuring sensor(s) on end effector 304 that are configured to measure a distance between the selected tool and the worksurface. The distance can then be provided to tool positioner logic 710 and used to determine whether the selected tool is too far or too close to the worksurface or at a correct location on the surface, etc. If tool positioner logic 710 determines that the tool is not positioned correctly, an indication can be provided to actuator control logic 702 to drive linkage movement of mobile machine 100 and robotic attachment 202 to correctly position the selected tool so that it follows the tool path.

Once the tool is correctly positioned, an indication can be provided from tool positioner logic 710 to tool control logic 714 indicating that the tool is correctly positioned on the tool path. Tool control logic 714, upon receiving the indication, can generate control signals for control system 632 to operate the tool along the tool path. Additionally, in some examples, tool control logic 714 can generate signals for actuator control logic 702 to drive linkage movement to maintain the tool on the tool path (or to move it along the tool path) during operation of the tool.

After operating the tool along the tool path, tool control logic 714 can determine whether the individual tool operation is completed. If so, tool control logic 714 can generate an indication to tool selection logic 712 to select a next tool, in the sequence of tools, used in performing the worksurface operation. However, if the tool operation is not completed, tool control logic 714 can continue to control the tool along the tool path. Logic 714 can also notify an operator of robotic machine 200.

Handheld control system 417 is configured to receive user inputs from handheld controller 436 and generate control signals to control controllable subsystem(s) 430 and/or controllable subsystem(s) 464 based on the user input. Handheld control system 417 includes mapping logic 736, subsystem control logic 738, retrieval logic 740, among a variety of other components and systems 742.

In operation, upon receiving a user input through handheld controller 436, mapping logic 736 accesses any or all data stores 411, 458, 750, and/or remote system(s) 216 to identify a control signal for a subsystem of mobile machine 100 and robotic attachment 202 corresponding to the user input. In one example, a subsystem can include actuator(s) 432, 308 configured to drive linkage movement of mobile machine 100 or robotic attachment 202. The subsystems can include other things as well. To identify a control signal, mapping logic 736 can access control mappings (or a control map), within data stores 411, 458, 750, that indicate a relationship between the user input and a control signal for a subsystem of mobile machine 100 or robotic attachment 202.

In one example, a control map can indicate that a user input corresponds to a directional change for end effector 304. Based on the directional change in the control map, mapping logic 736 identifies the control signals that will control the relevant actuator(s) 432 to drive a movement of end effector 304 in the desired direction. Upon identifying a control signal for a subsystem 430, 464, mapping logic 736 generates an output for subsystem control logic 738 that uses that output to generate the desired control signal. However, if a control map is not found within data stores 411, 458 and 750, mapping logic 736 can use retrieval logic 740 to access remote system(s) 216 to obtain a control map. If no map can be found, mapping logic 736 can generate a user interface display indicating that no map was found.

Subsystem control logic 738, in response to the output received from mapping logic 736, generates a control signal for the particular subsystem(s) 430, 464. In one example, this can include controlling actuator control logic 702 to generate actuator control signals for actuator(s) 432. However, it is contemplated that subsystem control logic 738 can generate control signals for a variety of other controllable subsystems in addition to, or different from, actuator(s) 432. In this manner, handheld controller 436, along with handheld control system 417, can be used by an operator to control mobile machine 100 and/or robotic attachment 202.

After a worksurface or worksite operation is completed, storage control system 419 is configured to position mobile machine 100 and robotic attachment 202 at a transport/storage position. In one example, a transport/storage position may include positioning robotic machine 200 on transport machine 204. Storage control system 419 includes storage position identification logic 722, object detection logic 724, path identification logic 726, position return logic 730, among a variety of other logic 732.

In operation, storage position identification logic 722 can identify a transport/storage position for mobile machine 100 and robotic attachment 202. In one example, this includes accessing any, or all of, data stores 411, 458 and 750 to obtain transport/storage positioning information for mobile machine 100 and robotic attachment 202. Transport/storage positioning information can include positioning information that identifies how the linkages of mobile machine 100 and robotic attachment 202 are to be positioned relative to one another (or relative to transport machine 204) for storage or transport.

Alternatively, transport/storage positioning information may include control signal information for actuator(s) 432 and steering and propulsion system 427 that can be used to control actuators 432 and machine 200 itself to correctly position the machine and its linkages at the storage/transport position. In one example, a storage/transport position may be different for each robotic machine 200 depending on a type of mobile machine 100, the type of robotic attachment 202 and the type of transport machine 204. In this example, transport/storage positioning information may be indexed based on a type of mobile machine 100, the type of robotic attachment 202 and/or the type of transport machine 204. Storage position identification logic 722 may then identify a type of mobile machine 100, robotic attachment 202 and transport machine 204 based on a user input, based on data within data stores 411, 458, 750, or based on sensor signals from sensors 416, 306. Once the storage/transport position for linkages of mobile machine 100 and robotic attachment 202 are identified, an indication of this is generated and provided to path identification logic 726.

Path identification logic 726, upon receiving the indication, determines a current position of linkages of mobile machine 100 and robotic attachment 202 based on sensor signals from sensor(s) 306, 416. Path identification logic 726 then identifies a difference between the current position and the transport/storage position. Path identification logic 726 also identifies a path for each linkage, which will move the linkage to the respective transport/storage position. In other examples, it is contemplated that storage position identification logic 722 can control actuator control logic 702 to generate control signals to move the linkages to their transport/storage position without first identifying a path for linkages of mobile machine 100 and robotic attachment 202.

In either example, path identification logic 726 controls actuator control logic 702 to generate actuator control signals to move the linkages to their respective transport/storage position. For example, actuator control logic 702 can generate control signals for actuator(s) 432 that drive movement of boom 114, arm 118, swing pivot 108, etc. In one example, this includes positioning linkages of mobile machine 100 so robotic attachment 202 rests in a cradle 206 on transport machine 204 so that end effector 304 is securely stored for transport. Lockouts can also be engaged on transport machine 204 or machine 102, in one example.

Position return logic 730 identifies and stores a return-to-operation position for mobile machine 100 and robotic attachment 202. In one example, a return-to-operation position corresponds to a position that mobile machine 100 and robotic attachment 202 were in just prior to being moved to a storage/transport position. In operation, prior to storing mobile machine 100, a user can provide a user input indicating a desired return-to-operation position. Position return logic 730 can then retrieve the stored return-to-operation position information for mobile machine 100 and robotic attachment 202 and can control actuator control logic 702 to generate control signals to position mobile machine 100 and robotic attachment 202 at the return-to-operation position. In one example, return-to-operation positional information can be determined based on sensor signals received from sensor(s) 306, 416.

During movement of machine 200 itself and linkages of mobile machine 100 and robotic attachment 202, object detection logic 724 can detect whether an object is in the way of, or impeding, movement of machine 100 or linkages of mobile machine 100 and/or robotic attachment 202. In one example, this is determined based on signals received from sensor(s) 416, 306. If an object is detected, object detection logic 724 can notify an operator of mobile machine 100 and/or stop movement of linkages of mobile machine 100 and/or robotic attachment 202.

Machine and robotic control system 214 also illustratively includes stabilization logic 748. Stabilization logic 748, in one example, generates control signals to lock the bigger, stronger, cylinders 308 in place when a load is imparted on attachment 202. In one example, by locking the bigger, stronger cylinders 308, the cylinders 308 shunt the load around the smaller, more precise cylinders 309, thereby protecting them. Stabilization logic 748 can generate control signals in response to a received user input, and/or sensor signals received from sensor(s) 416, 306 indicating a load is to be imparted on attachment 202.

Figure 8A:
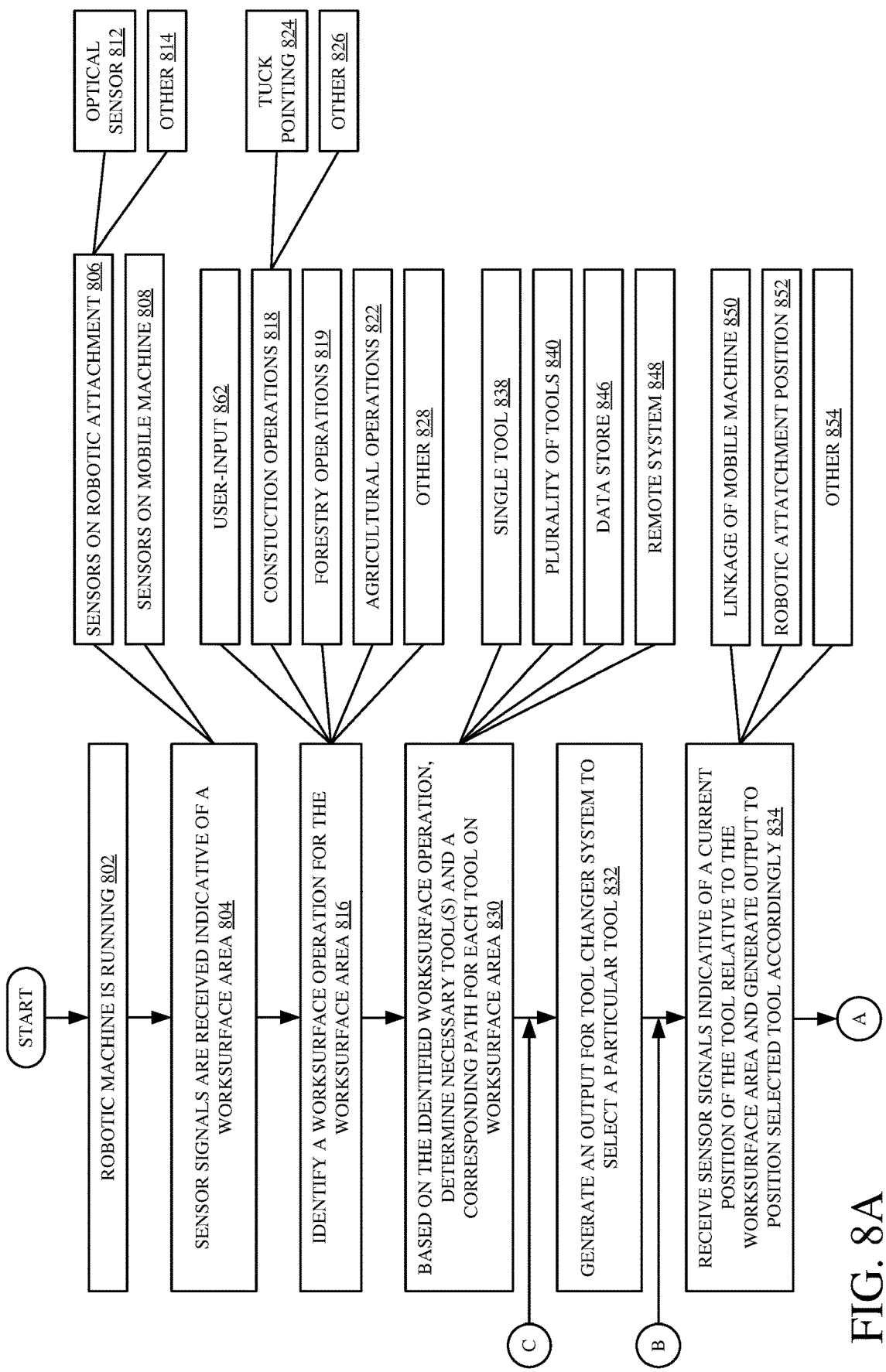
FIGS. 8A-8B are flow diagrams showing one example operation of controlling a robotic machine using a machine and robotic control system illustrated in FIG. 7.
Figure 8B:
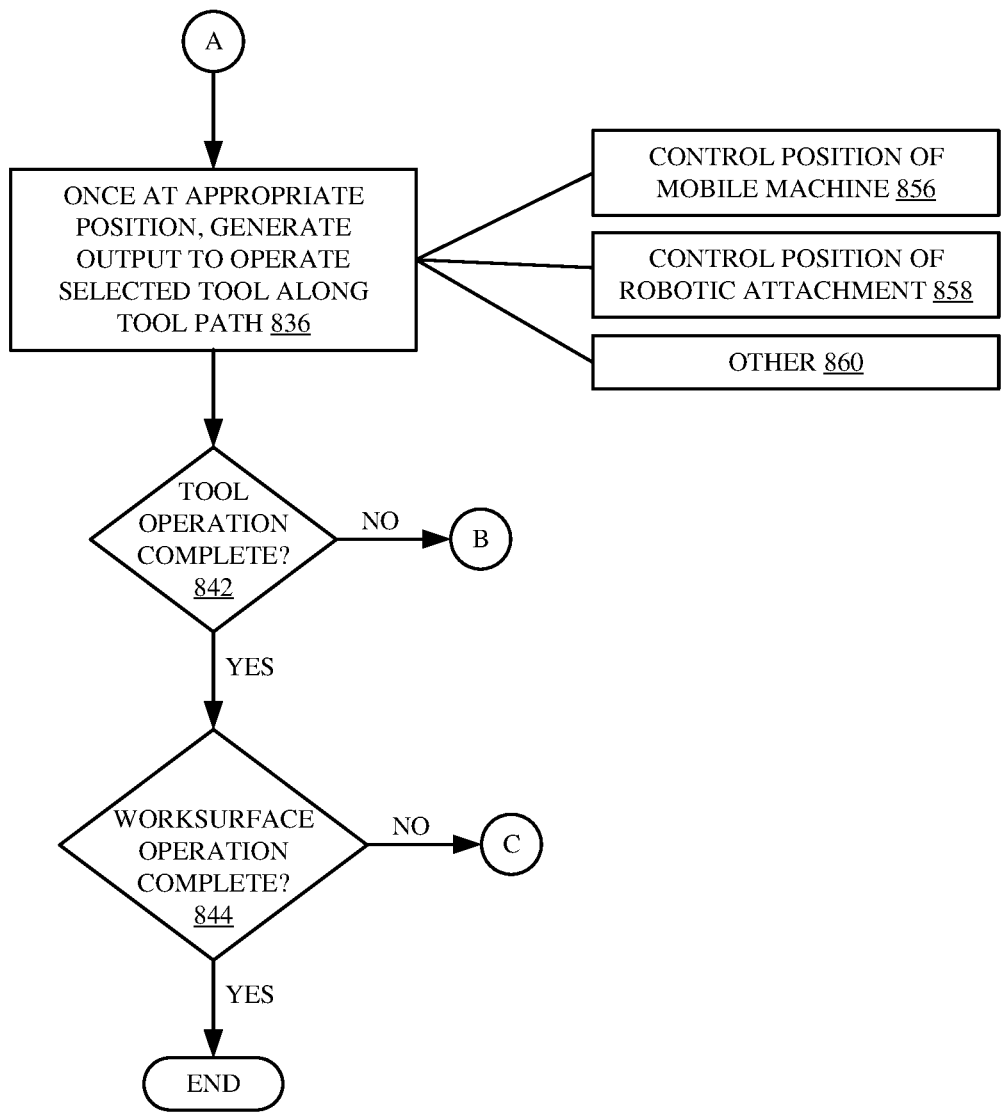

FIGS. 8A-8B are flow diagrams showing one example controlling a robotic machine using a machine and robotic control system 214 illustrated in FIG. 7. The operation shown in FIGS. 8A-8B is an example in which tool changer system 314 of robotic attachment 202 is controlled to select different tools using machine and robotic control system 214. While it is discussed in the context of operating and obtaining data relative to tool changer system 314, this is just one example. Further, while the operation will be described in accordance with mobile machine 100 and robotic attachment 202, it is to be understood that other mobile machines and robotic attachments can be used as well.

Processing begins at block 802 where robotic machine 200 is operating. Robotic machine 200 includes mobile machine 100 coupled to robotic attachment 202 through link 444. In one example, robotic machine 200 can be running after an operator provides inputs to begin operation of robotic machine 200. This can be done in a variety of ways. For instance, the operator can provide initial machine settings based on a worksite operation. Alternatively, the operator can input these settings based upon his or her own prior experience and knowledge. The settings can be made manually, such as through mechanical or other user input mechanisms, or they can be made automatically by the machine itself, or they can be input in a different way, such as through a touch screen or other user input mechanism. While robotic machine 200 is running, sensor signals are received by work area identification logic 706 as indicated by block 804. In one example, sensor signals can be generated by sensors 306, as indicated by block 806, or sensor(s) 416, as indicated by block 808. Sensor(s) 306 can include an optical sensor, as indicated by block 812, among a variety of other sensor(s), such as a distance measurement sensor, as indicated by block 814. These are examples only.

Processing turns to block 816 where work area identification logic 706 identifies a worksurface based on the received sensor signals. In one example, the worksurface can include an area adjacent to robotic attachment 202, as detected by optical sensor(s) 306, on which a worksurface operation is to be performed. Based on the identified worksurface, or based on an operator input, work area identification logic 706 determines a worksurface operation for the worksurface. Determining a worksurface operation can include accessing and utilizing worksurface information from any or all data stores 411, 458 and 750 to identify the worksurface operation. In other examples, a user input can indicate a desired worksurface operation as indicated by block 862. A worksurface operation can include a construction operation, as indicated by block 818, a forestry operation, as indicated by block 819, an agricultural operation, as indicated by block 822, or any other operation as indicated by block 828. For example, a construction operation may include a tuck-pointing operation for the identified worksurface, as indicated by block 824, or any other construction operation as indicated by block 826.

Upon identifying a worksurface operation for the worksurface, a worksurface output that identifies the location of the worksurface and the operation to be performed, can be generated by work area identification logic 706 and provided to tool path determination logic 708. At block 830, tool path determination logic 708 receives the worksurface output and determines the tool(s) and tool paths for tool(s) 600 in tool changer system 314 that will be used to complete the worksurface operation. In one example, this includes determining a tool path for a singular tool 600, as indicated by block 838, or determining a sequence of different tools that will be used, along with a tool path for each tool in the sequence as indicated in block 840. To determine the tool(s) and tool paths, tool path determination logic 708 can obtain worksurface operational data within any or all data stores 411, 458, and 750, as indicated by block 846. The worksurface operational data can include information identifying the tools for the worksurface operation and operational information for each tool. However, tool path determination logic 708 can also access remote system(s) 216 in other examples, as indicated by block 848.

Based on the tool(s) 600 and tool path(s), processing turns to block 832 where tool selection logic 712 generates a tool selection output for tool changer system 314 to select a tool to perform the identified worksurface operation. Once the tool selection output is received by tool changer system 314, tool changer mechanism 626 selects the appropriate tool. Once selected, processing turns to block 834 where tool positioner logic 710 receives sensor signals from any or all of sensor(s) 306, 416 indicative of a current position of the selected tool. This can include optical sensor(s), distance measurement sensor(s), etc.

Tool positioner logic 710 determines whether the current position of the selected tool is on the tool path. If the current position of the tool is different from the tool path, tool position logic 710 controls actuator control logic 702 to control actuators to position the tool on the tool path. In one example, this includes generating actuator control signals for actuator(s) on mobile machine 100 that drive linkage movement on mobile machine 100, as indicated by block 850. They can drive movement of linkages on robotic attachment 202, as indicated by block 852, or on other systems as indicated by 854.

Once correctly positioned on the tool path, as determined by tool positioner logic 710, processing turns to block 836 where tool control logic 714 generates control signals for tool control system 632 to operate the selected tool on the tool path. In one example, this also includes controlling actuator control logic 702 to generate control signals for actuator(s) of mobile machine 100, as indicated by block 856, robotic attachment 202, as indicated by block 858, or other subsystems to modify a position of mobile machine 100 and robotic attachment 202 to ensure the tool follows the tool path as it is operating. After operating the selected tool along the tool path, tool control logic 714 determines whether the tool operation is complete, as indicated by block 842. In one example, tool control logic 714 can receive sensor signals from sensors 306, 416 to determine whether the tool operation is complete. As an example, assume the selected tool is a chisel that is used to remove mortar. The sensor information may include, for instance, a visual input that is subjected to image processing to, for example, ensure that mortar is removed from the worksurface. However, a user input may also be received indicating the tool operation is complete. If not, processing proceeds back to block 834 where tool positioner logic 710 ensures that the tool continues to be operated on the tool path. If this tool operation is complete, processing proceeds to block 844 where tool path determination logic 708 determines whether the entire worksurface operation is also completed.

If the entire worksurface operation is completed, at block 844, processing subsequently ends. However, if the worksurface operation is not completed, processing reverts to block 832 where tool selection logic 712 generates a tool output for tool changer mechanism 626 to select the next tool in the sequence of tools that are used to perform the worksurface operation.

Figure 9:
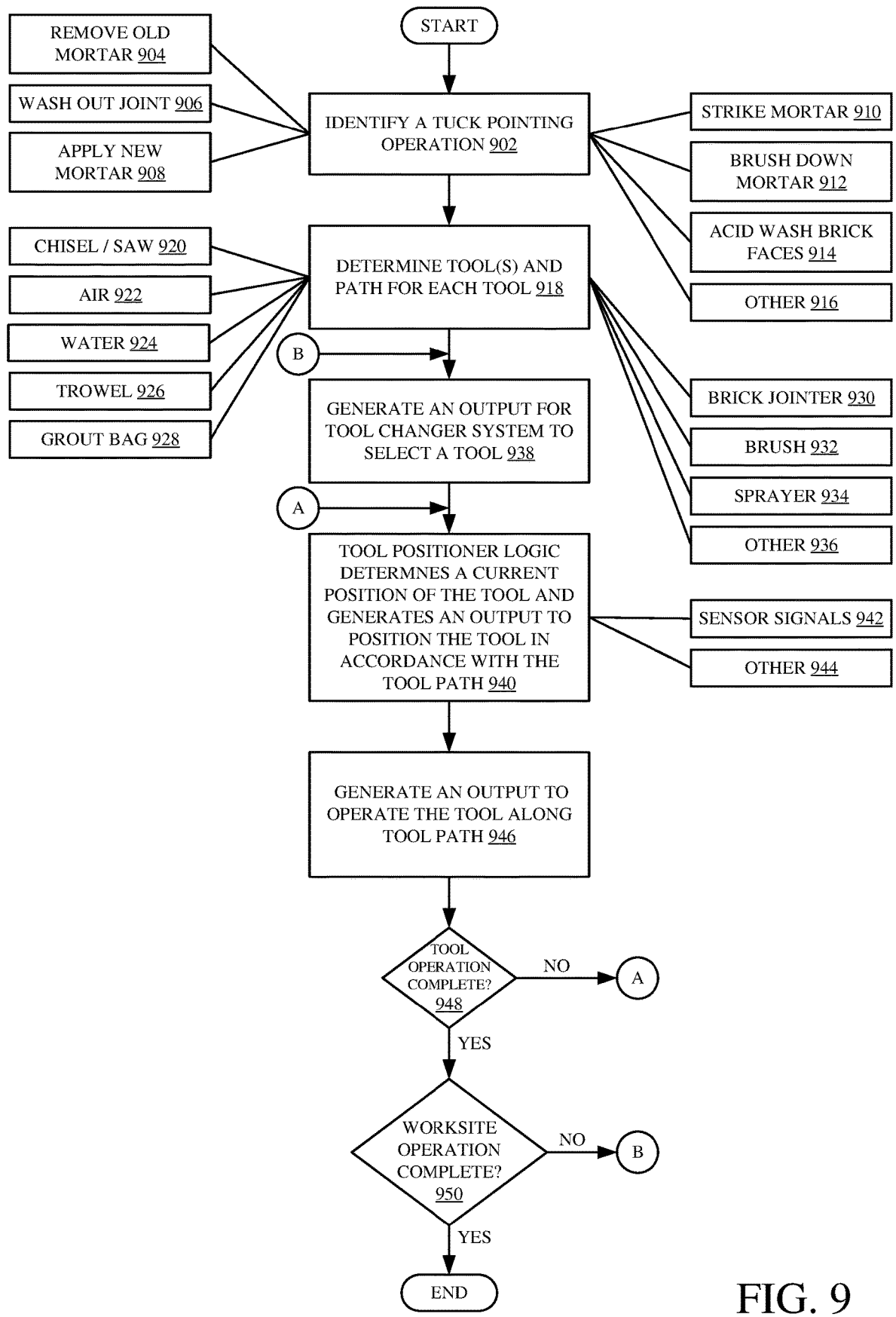
FIG. 9 is a flow diagram showing one example operation of controlling a robotic machine in accordance with a tuckpointing operation using a machine and robotic control system illustrated in FIG. 7.

FIG. 9 is a flow diagram showing one example operation of controlling a robotic machine to perform a tuckpointing operation using a machine and robotic control system 214 illustrated in FIG. 7. Processing begins at block 902 where work area identification logic 706 identifies a worksurface operation, that includes a tuck-pointing operation, for an identified worksurface that includes a brick wall. Work area identification logic 706 can identify the worksurface based on sensor signals received from any or all of sensor(s) 306, 416. Additionally, the tuck-pointing operation can be identified based on a received user input or otherwise.

In one example, a tuck-pointing operation can include using a variety of tools to remove old mortar, as indicated by block 904, wash out a joint, as indicated by block 906, apply new mortar, as indicated by block 908, strike mortar, as indicated by block 910, brush down mortar, as indicated by block 912, acid wash brick faces, as indicated by block 914, among a variety of other steps as indicated by block 916. Upon identifying the tuck-pointing operation for the brick wall, processing proceeds to block 918 where tool path determination logic 708 determines tool(s) 600, tool sequence, and corresponding tool paths that will be used to complete the tuck-pointing operation. This includes determining tool paths for a chisel/saw, as indicated by block 920, an air source, as indicated by block 922, a water source, as indicated by block 924, a trowel, as indicated by block 926, a grout bag, as indicated by block 928, a brick jointer, as indicated by block 930, a brush, as indicated by block 932, a sprayer, as indicated by block 934, among other tools as indicated by block 936.

Upon identifying the tools, tool sequence, and tool path(s), processing turns to block 938 where tool selection logic 712 generates an output for tool changer mechanism 626 to select a tool to perform the tuck-pointing operation. In one example, this includes selecting a chisel/saw to remove old mortar in accordance with the first step in a tuck-pointing operation. Once the output is received, tool changer mechanism 626 selects the chisel/saw from the storage mechanism 622.

Tool positioner logic 710 then determines a current position of the selected tool as indicated by block 940. In one example, a current position of the selected tool can be determined based on sensor signal(s), as indicated by block 942, indicative of a position of the mortar to be removed from the worksurface (identified, for example, from a visual image), and a current position of the chisel/saw. If the chisel/saw is not in a position to perform its operation, as indicated by the tool path, tool positioner logic 710 controls actuator control logic 702 to drive movement of linkages of mobile machine 100 and robotic attachment 202 to position the chisel/saw in the proper position and to move it along the tool path.

Once the chisel/saw is positioned in the right position, processing turns to block 946 where tool control logic 714 controls tool control system 632 to operate the chisel/saw to remove old mortar as the first step in the tuck-pointing operation. In one example, tool control logic 714 can also control actuator control logic 702 to generate actuator control signals to drive linkage movement of mobile machine 100 and robotic attachment 202 to ensure the chisel/saw is moved along the tool path. The tool path can be updated based on sensor signals (such as image signals or position signals) so the tool follows the mortar line on the worksurface. Tool control logic 714 determines whether the selected tool operation, where old mortar is removed, is complete as indicated by block 948. If the tool operation is not complete, processing turns back to block 940 where tool positioner logic 710 continues to ensure that the chisel/saw is moved along the correct path. If the tool operation is complete, processing turns to block 950 where tool path determination logic 708 determines whether the entire tuck-pointing operation is complete.

If tool path determination logic 708 determines that the tuck-pointing operation is not complete after the current tool operation (e.g. after the chisel/saw has removed the old mortar), processing turns to block 938 where tool selection logic 712 generates a signal for tool changer mechanism 626 to select the next tool in the sequence of tools used to perform the tuck-pointing operation. The newly selected tool 600 can then be controlled along the identified tool path(s) to perform the next step in the tuck-pointing operation. If, at block 950, tool path determination logic 708 determines that the tuck-pointing operation is complete, processing subsequently ends.

Figure 10:
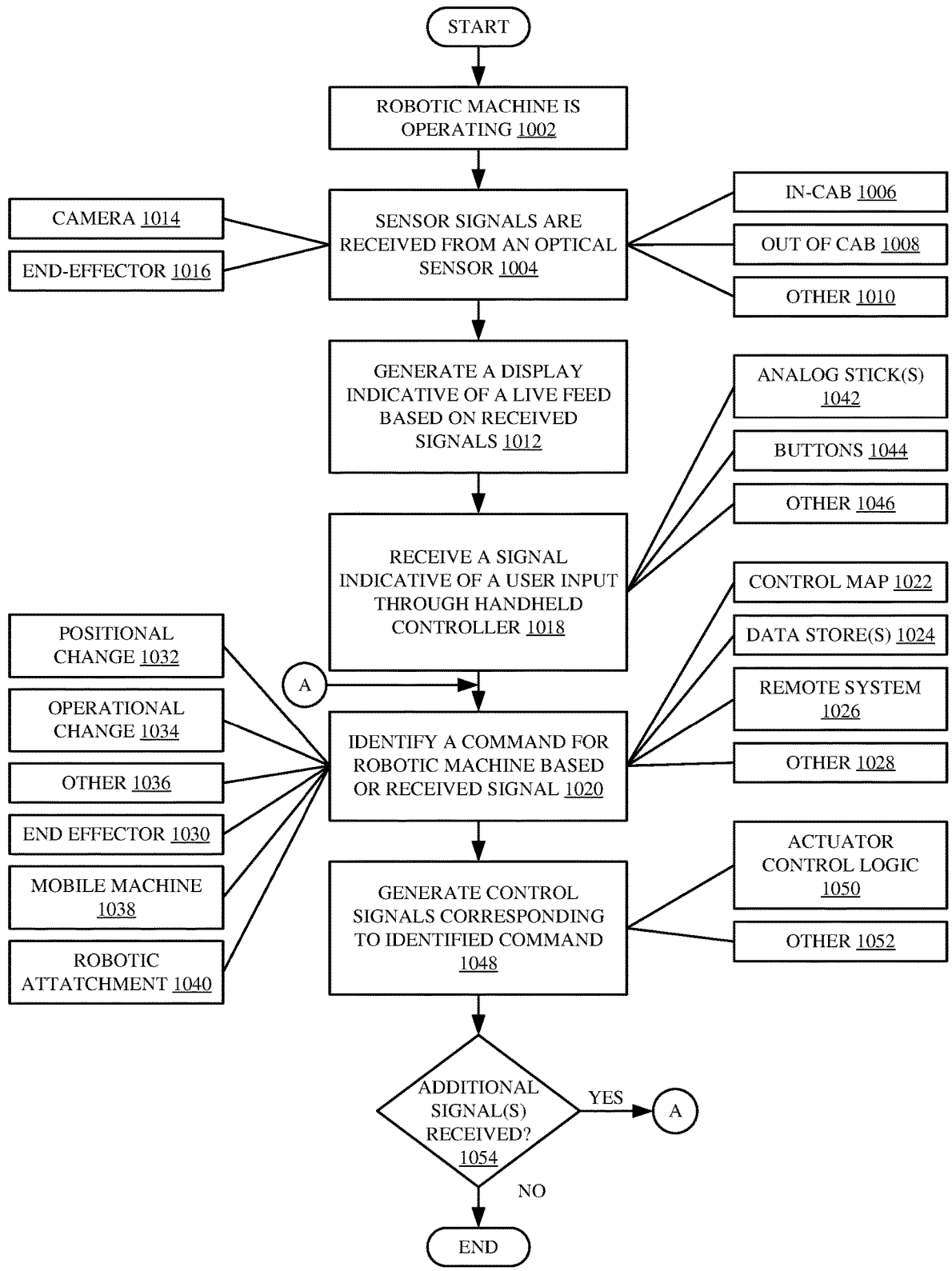
FIG. 10 is a flow diagram showing one example operation of controlling a robotic machine using a handheld controller and a machine and robotic control system illustrated in FIGS. 5 and 7 respectively.

FIG. 10 is a flow diagram showing one example operation of controlling a robotic machine using a handheld controller 436 and a machine and robotic control system 214 illustrated in FIGS. 5 and 7, respectively. Processing begins at block 1002 where robotic machine 200 is operating in accordance with operating inputs received from an operator of robotic machine 200. During an operation of robotic machine 200, sensor signals are generated from sensor 306 on robotic attachment 202 and provided to user interface device 406 as indicated by block 1004. User interface device 406 can include display device 438, within cab 110, as indicated by block 1006, or, alternatively, display devices located out-of-cab or on a device (such as a mobile device) carried by the operator, as indicated by block 1008. However, other user interface devices can be used as well as indicated by block 1010. Additionally, sensor 306 can include an optical sensor (e.g., a camera), as indicated by block 1014, positioned on end effector 304, as indicated by block 1016, configured to generate signals indicative of an area adjacent to, or being operated on by, end effector 304.

Upon receiving the sensor signals from sensor 306, processing turns to block 1012 where user interface device 406 generates a display based on the received sensor signals from sensor 306. In one example, the display includes a live view of a worksite area adjacent to end effector 304. Once a display is generated, processing turns to block 1018 where mapping logic 736 receives a user input from user input mechanisms 522 of handheld controller 436. In one example, a user input can be received from analog stick(s) 502, as indicated by block 1042, buttons(s) 508, as indicated by block 1044, among a variety of other input mechanisms, as indicated by block 1046, on handheld controller 436. Additionally, while a user input is received after generating a display, it is expressly contemplated that a user input can be received at any point during operation of mobile machine 100 and robotic attachment 202 even if a display is not generated on display device 438. However, in this example, the display can provide a reference feed to an operator of robotic machine 200 in controlling mobile machine 100 and robotic attachment 202 and can further be used as feedback in controlling mobile machine 100 and robotic attachment 202.

Based on the user input, processing turns to block 1020 where mapping logic 736 identifies a control signal to generate that will control subsystems 430, 464 of mobile machine 100 and robotic attachment 202, respectively, based on the user input. In one example, identifying a control signal to generate based on the user input includes obtaining one or more control maps (or those maps may be pre-loaded), as indicated by block 1022, from any or all data stores 411, 458, 750, as indicated by block 1024, or from remote system(s) 216, as indicated by block 1026, or other systems, as indicated by block 1028. The control maps, in one example, can indicate a relationship between the received user input from user input mechanisms 522 and a corresponding control signal that should be generated in response to that user input, to control subsystems 430, 464 of mobile machine 100 and robotic attachment 202.

For example, assume that a user input was received based on the user actuating analog stick 502 on handheld controller 436. Then, a control map can indicate that the user input through analog stick 502 corresponds to a control signal that is used to control cylinder 116 to modify a position of boom 114 in a particular direction. Alternatively, if a user input was received through button(s) 508, a control map can indicate that a corresponding control signal should be generated to control some movement or operation of end effector 304 of robotic attachment 202. The control maps can indicate a position change for components of mobile machine 100 and robotic attachment 202, as indicated by block 1032, an operation change, as indicated by block 1034, or other changes as indicated by block 1036. Also, the control signals can be generated, using the control map, to control end effector 304, as indicated by block 1030, subsystems of mobile machine 100, as indicated by block 1038, and subsystems of robotic attachment 202, as indicated by block 1040.

Upon identifying a command, processing turns to block 1048 where subsystem control logic 738 generates a control signal indicated by the identified control map. In one example, subsystem control logic 738 can control actuator control logic 702 to generate actuator control signals for actuators 432, as indicated by block 1050. However, other control signals for subsystems 430 and 464 can be generated based on the corresponding command as indicated by block 1052.

Processing proceeds to block 1054 where mapping logic 736 determines if there are additional user inputs received. If so, processing proceeds back to block 1020 where mapping logic 736 identifies a corresponding command for mobile machine 100 and/or robotic attachment 202. If no further user inputs are received, processing subsequently ends.

Figure 11:
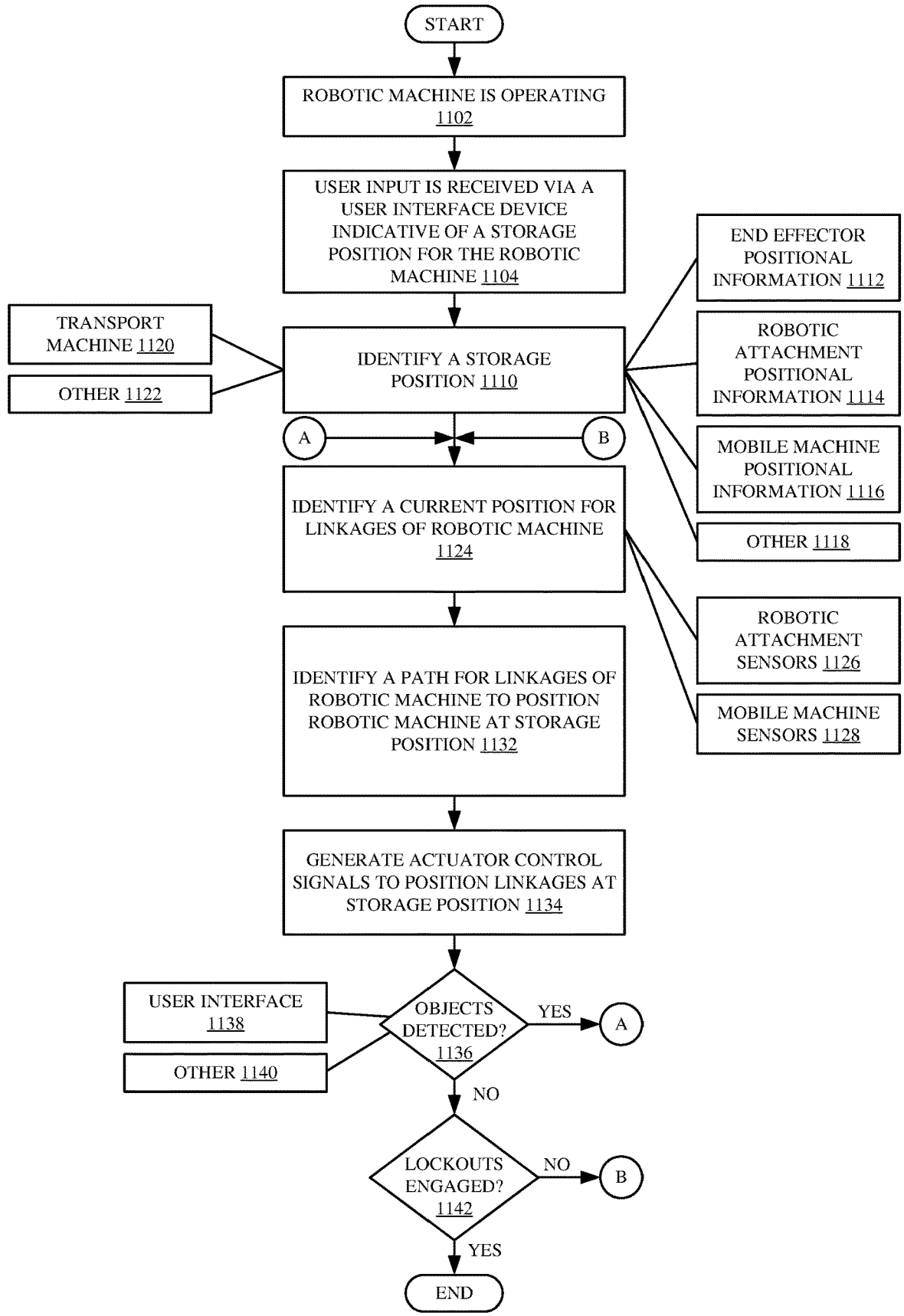
FIG. 11 is a flow diagram showing one example operation of storing a robotic machine using a machine and robotic control system illustrated in FIG. 7.

FIG. 11 is a flow diagram showing one example operation of storing a robotic machine using a machine and robotic control system 214 illustrated in FIG. 7. Processing begins at block 1102 where robotic machine 200 is operator based on operating inputs received from an operator of robotic machine 200. Operator inputs can be received through user interface device 406 in one example. During an operation of robotic machine 200, processing turns to block 1104 where a user input is received indicating robotic machine 200 is to be positioned at a transport/storage position. In one example, a storage position can include a position that machine 200 is to be in when on transport machine 204, where robotic machine 200 engages lockouts, or a variety of other storage/transport positions.

Upon receiving the user input to move to the transport/storage position, processing turns to block 1110 where storage position identification logic 722 identifies the storage/transport position for robotic machine 200. In one example, the storage/transport position can be identified using position information that identifies the storage/transport position for end effector 304, as indicated by block 1112, for robotic attachment 202, as indicated by block 1114, and/or for mobile machine 100, as indicated by block 1116. A variety of other information can be used as well, as indicated by block 1118. The position information can be stored within any or all data stores 411, 458, 750 and/or remote system(s) 216. Position information can include linkage positioning information for linkages of mobile machine 100 and robotic attachment 202 that, in one example, includes information for positioning boom 114, arm 118 and/or end effector 304 at their respective storage/transport positions. Additionally, position information can include linkage position information or geographic position information that defines how mobile machine 100 and robotic attachment 202 should be positioned on transport machine 204, as indicated by block 1120, or other machines as indicated by block 1122.

Once a transport/storage position is identified, processing turns to block 1124 where path identification logic 726 identifies a current position of linkages of mobile machine 100 and robotic attachment 202, and of machine 200 itself, based on sensor signals received from sensors located on robotic attachment 202, as indicated by block 1126, or on mobile machine 100, as indicated by block 1128.

At block 1132, path identification logic 726 identifies a path for various linkages of mobile machine 100 and robotic attachment 202 to position the linkages at the storage/transport position. For example, path identification logic 726 can determine that machine 200 must be driven onto machine 204. It may know the position and orientation of machine 204 from its own sensors and/or from sensors on machine 204. It can thus control the machine 200 to automatically drive it onto machine 204. Logic 726 can also determine, for example, that swing pivot 108 is to be pivoted to a certain position or orientation and boom 114 needs to be lowered so robotic attachment 202 engages cradles 206 of transport machine 204.

In response to identifying a path for machine 200 and linkages of mobile machine 100 and robotic attachment 202, processing turns to block 1134 where actuator control logic 702 generates actuator control signals for actuator(s) 432 or 464 to drive movement of mobile machine 100 and robotic attachment 202. Additionally, control signals can be generated for steering and propulsion system 427 to move machine 200. While machine 200 is moving and while linkages of mobile machine 100 and robotic attachment 202 are moving, object detection logic 724 determines whether there are any objects impeding movement of the machine 200 or the linkages (or in the imminent path of movement), as indicated by block 1136. This can include generating a user interface display, as indicated by block 1138, or any other alerts/notifications as indicated by block 1140.

If an object is impeding movement of the linkages or machine 200 (or in their path), processing reverts back to block 1124 where a new path of the linkages is identified using path identification logic 726. The new path or new position is identified to avoid any objects. If no object is detected, processing proceeds to block 1142 where path identification logic 726 determines whether a transport/storage position is achieved. In one example, the storage/transport position includes engaging lockouts on machine 200 so that it cannot inadvertently be started or moved on transport machine 204, and so that it is maintained in a safe transport state, as indicated by block 1142. Also, in one example, determining whether machine 200 is in the transport/storage position includes receiving sensor signals from sensor(s) 306, 416 to determine whether the robotic machine 200 is correctly positioned at the transport/storage position. If so, processing subsequently ends. If not, processing reverts back to block 1124 where path identification logic 726 determines how to move machine 200 or linkages of mobile machine 100 and robotic attachment 202 to attain the transport/storage position.

Figure 12:
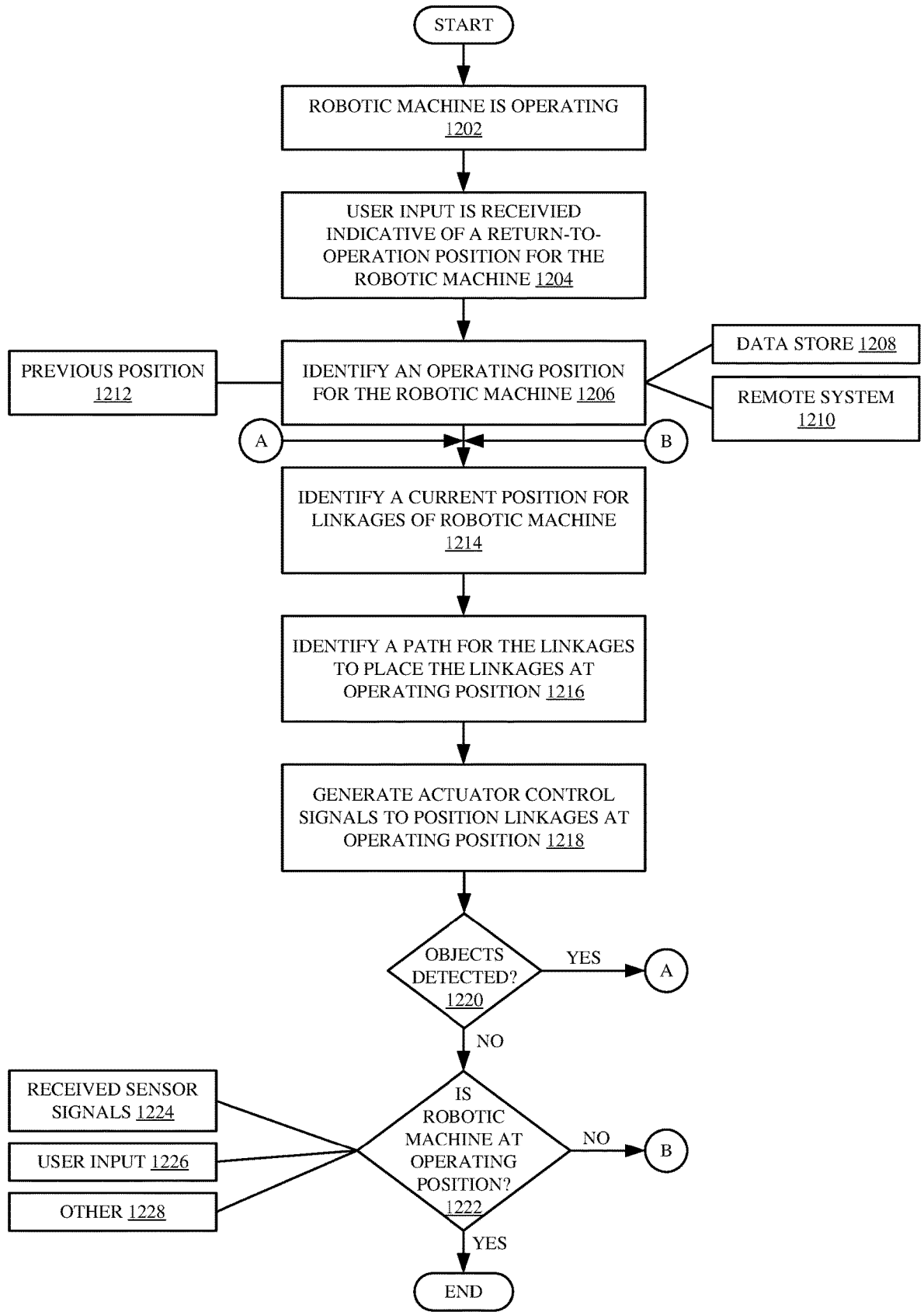
FIG. 12 is a flow diagram showing one example operation of returning a robotic machine to an operating position using a machine and robotic control system illustrated in FIG. 7.

FIG. 12 is a flow diagram showing one example operation of returning a robotic machine 200 from the transport/storage position to an operating position (either automatically or semi-automatically) using a machine and robotic control system 214 illustrated in FIG. 7. By automatically, it is meant that the operation or function is performed without further operator involvement, except, perhaps, to initiate or approve the operation or function.

Processing begins at block 1202 where robotic machine 200 is operating in accordance with operating inputs received from an operator of robotic machine 200. During operation of robotic machine 200, processing proceeds to block 1204 where a user input is received indicating robotic machine 200 is to be positioned at a return-to-operation position. In one example, a return-to-operation position corresponds to an operation position for robotic machine 200 just prior to robotic machine 200 being positioned at a storage/transport position. It can also be a position that is marked by the operator. For instance, when machine 200 is in an operating position, the operator may actuate a user input mechanism which causes the system to save the current position and orientation of machine 200, and its actuators, as an operating position.

Upon receiving the user input indicating machine 200 is to return to the operating position, processing turns to block 1206 where position return logic 730 identifies the return-to-operation position for robotic machine 200. The return-to-operation information can be stored in any or all data stores 411, 458 and 750, as indicated by block 1208, and/or remote system(s) 216 as indicated by block 1210. In one example, the return-to-operation position corresponds to an operating position of robotic machine 200 just prior to robotic machine 200 being positioned at a storage/transport position, as indicated by block 1212.

Once the return-to-operation position is identified, processing proceeds to block 1214 where path identification logic 726 determines a current position of machine 200 and the linkages of mobile machine 100 and robotic attachment 202 based on sensor signals received from sensor(s) 306, 416. In one example, a current position corresponds to a storage/transport position for the linkages of mobile machine 100 and robotic attachment 202. Path identification logic 726 then identifies a travel path for machine 200 and a linkage path for the linkages to position machine 200 and its linkages (such as boom 114, arm 118, etc.) at the return-to-operation position as indicated by block 1216.

Based on the travel path and linkage paths, actuator control logic 702 generates control signals for actuator(s) 432, as indicated by block 1218, to position machine 200 and the linkages at the return-to-operation position. In one example, this includes generating control signals for steering and propulsion system 427. Additionally, during movement of the machine and the linkages, object detection logic 724 determines whether any objects are in those paths or impeding movement of the machine or the linkages, as indicated by block 1220, using sensor(s) 306, 416. If any objects are detected, processing reverts back to block 1214 where path identification logic 726 identifies a different path for the machine or the linkages of mobile machine 100 and/or robotic attachment 202 so the object(s) can be avoided. If not, processing proceeds to block 1222 where path identification logic 726 determines whether robotic machine 200 is at the return-to-operation position. In one example, path identification logic 726 can receive sensor signals from sensor(s) 306, 416 to determine whether robotic machine 200 is at the return-to-operation position, as indicated by block 1224, or, alternatively, can receive a user input indicating robotic machine 200 is at the return-to-operation position as indicated by block 1226. However, other information can be used as well to determine whether robotic machine 200 is correctly at the return-to-operation position as indicated by block 1228. If robotic machine 200 is correctly positioned, processing subsequently ends. If not, processing reverts back to block 1214 where path identification logic 726 continues to identify the path to get there.

Figure 13:
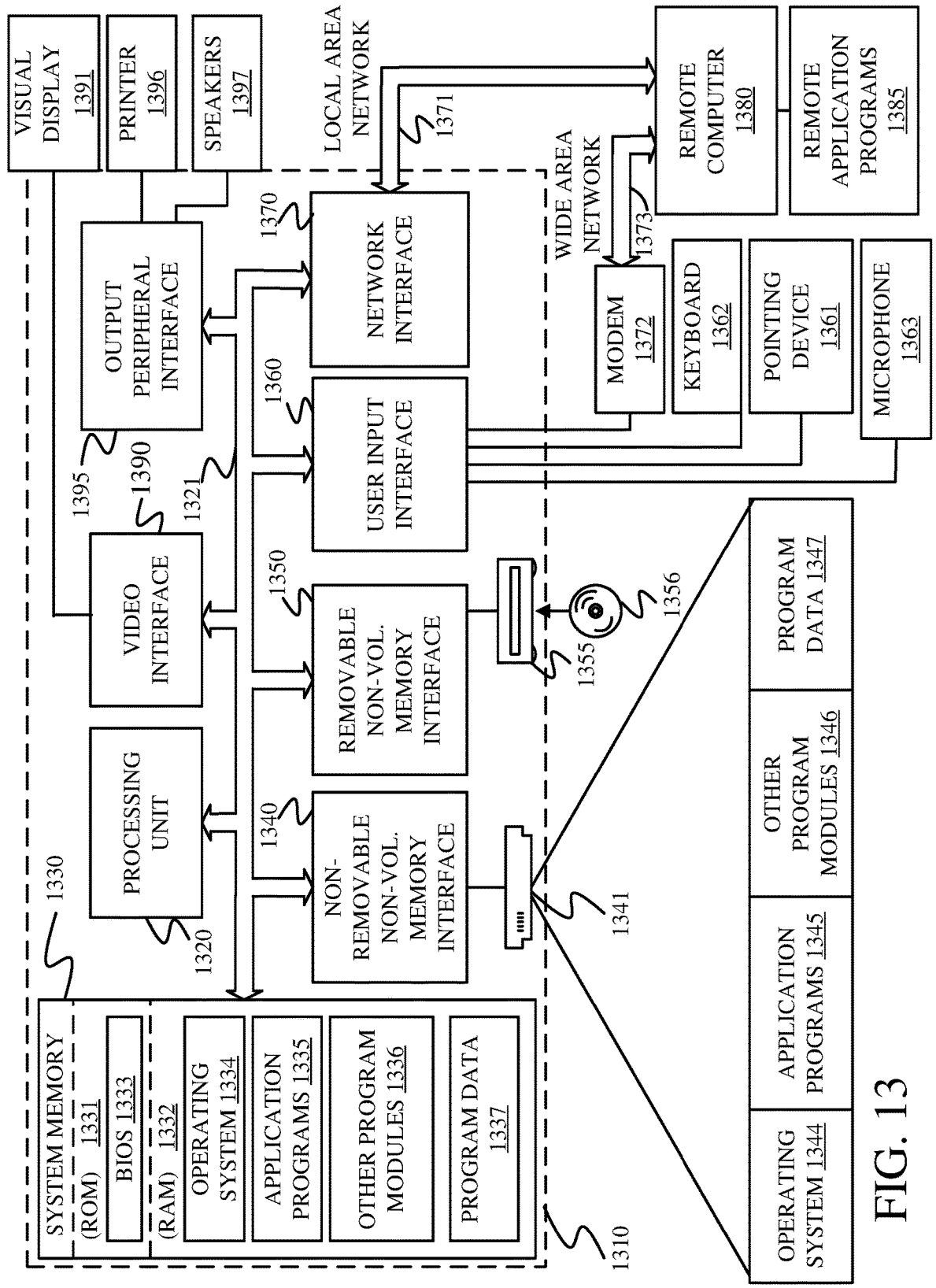
FIG. 13 is a block diagram showing one example of a computing environment that can be used in the architecture illustrated in previous FIGS.

FIG. 13 is a block diagram showing one example of a computing environment that can be used in the architecture illustrated in previous FIGS. With reference to FIG. 13, an example system for implementing some examples includes a general-purpose computing device in the form of a computer 1310. Components of computer 1310 may include, but are not limited to, a processing unit 1320 (which can comprise processors or servers from previous Figures), a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. Memory and programs described with respect to FIGS. 4-7 can be deployed in corresponding portions of FIG. 13.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1310. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable volatile/nonvolatile computer storage media. By way of example only, FIG. 13 illustrates a hard disk drive 1341 that reads from or writes to non-removable, nonvolatile magnetic media, and an optical disk drive 1355, and nonvolatile optical disk 1356. The hard disk drive 1341 is typically connected to the system bus 1321 through a non-removable memory interface such as interface 1340, and optical disk drive 1355 are typically connected to the system bus 1321 by a removable memory interface, such as interface 1350.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337.

A user may enter commands and information into the computer 1310 through input devices such as a keyboard 1362, a microphone 1363, and a pointing device 1361, such as a mouse, trackball or touch pad. Other input devices (not shown) may include a joystick, game pad, satellite dish, scanner, or the like. These and other input devices are often connected to the processing unit 1320 through a user input interface 1360 that is coupled to the system bus, but may be connected by other interface and bus structures. A visual display 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1395.

The computer 1310 is operated in a networked environment using logical connections (such as a local area network—LAN, or wide area network WAN) to one or more remote computers, such as a remote computer 1380.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. In a networked environment, program modules may be stored in a remote memory storage device. FIG. 13 illustrates, for example, that remote application programs 1385 can reside on remote computer 1380.

It should also be noted that the different examples described herein can be combined in different ways. That is, parts of one or more examples can be combined with parts of one or more other examples. All of this is contemplated herein.

Example 1 is a mobile robotic machine, comprising:
a mobile machine having a propulsion system controllable by an operator to drive the mobile machine and a first actuator;
a robotic attachment operably coupled to the mobile machine and being positioned by the first actuator, the robotic attachment having an end effector that fits a plurality of different tools;
a sensor that generates a sensor signal indicative of a characteristic of a worksurface on which a worksurface operation is to be performed using the plurality of different tools, each tool performing a corresponding tool operation, in an operation sequence, and to generate a sensor signal indicative of the characteristic of the worksurface; and
a machine and robotic control system, that receives an indication of the worksurface operation to be performed and the sensor signal and generates a control signal to control the end effector to use each of the plurality of different tools, in the operation sequence, to perform the worksurface operation on the worksurface.

Example 2 is the mobile robotic machine of any or all previous examples wherein the end effector comprises:
a tool changer system that carries the plurality of different tools for use by the end effector.

Example 3 is the mobile robotic machine of any or all previous examples wherein the machine and robotic control system comprises:
tool selection logic configured to select one of the plurality of different tools and generate a tool selection signal indicative of the selected tool.

Example 4 is the mobile robotic machine of any or all previous examples wherein the tool changer system is configured to automatically change a tool being used by the end effector to the selected tool based on the tool selection signal.

Example 5 is the mobile robotic machine of any or all previous examples wherein the machine and robotic control system comprises:
tool path generation logic configured to receive the indication of the worksurface operation and the tool selection signal and determine a tool path over which the selected tool is to pass when performing its corresponding tool operation, and to generate a tool path signal indicative of the tool path.

Example 6 is the mobile robotic machine of any or all previous examples wherein the machine and robotic control system comprises:
tool positioner logic configured to receive the tool path signal and generate a position control signal to control the actuator and the robotic attachment to move the selected tool along the tool path.

Example 7 is the mobile robotic machine of any or all previous examples and further comprising:
tool control logic configured to generate a tool operation control signal to operate the tool as the tool is moved along the travel path, to perform its corresponding tool operation.

Example 8 is the mobile robotic machine of any or all previous examples wherein the machine and robotic control system comprises:
a handheld control system configured to receive a user input signal generated by user actuation of a user input mechanism on a handheld controller and generate a control signal for the first actuator to position the robotic attachment relative to the worksurface such that the sensor generates the sensor signal indicative of the characteristic of the worksurface.

Example 9 is the mobile robotic machine of any or all previous examples wherein the handheld control system comprises:
mapping logic configured to receive the user input signal and access a control map that maps the user input signal to a control signal output, to identify a control signal value based on the control signal output, the handheld control system generating the control signal based on the identified control signal value.

Example 10 is a mobile robotic machine, comprising:
a mobile machine having a frame, a propulsion system coupled to the frame and controllable by an operator to drive the mobile machine, a first actuator that drives movement of a portion of the mobile machine relative to the frame and a second actuator;

a robotic attachment operably coupled to the mobile machine and being positioned by the movement of second actuator, the robotic attachment having an end effector that fits a tool;

a position sensing system, that generates position sensor signals indicative of a position of the robotic attachment relative to the mobile machine and a position of the mobile machine; and a storage control system configured to receive a return-to-storage user input and, based on the return-to-storage user input, automatically controls the first and second actuators to move the mobile machine and the robotic attachment into a predefined storage position.

Example 11 is the mobile robotic machine of any or all previous examples wherein the robotic attachment comprises:

a robotic control actuator that controls movement of a portion of the robotic attachment.

Example 12 is the mobile robotic machine of any or all previous examples wherein the storage control system is configured to control the robotic control actuator to move the robotic attachment into the predefined storage position.

Example 13 is the mobile robotic machine of any or all previous examples wherein the storage control system is configured to automatically control the propulsion system to move the mobile machine to the predefined storage position.

Example 14 is the mobile robotic machine of any or all previous examples wherein the storage control system is configured to receive a return-to-operating user input and, based on the return-to-operating user input, automatically controls the first and second actuators to move the mobile machine and the robotic attachment into a predefined operating position.

Example 15 is the mobile robotic machine of any or all previous examples wherein the storage control system comprises:

storage position identification logic configured to access stored position information that defines the predefined storage position, to identify the predefined storage position; and path identification logic configured to identify a current position of the mobile machine and the robotic attachment and, based on the current position and the predefined storage position, generate a control signal to control the first and second actuators to move the robotic attachment along a travel path to the predefined storage position.

Example 16 is the mobile robotic machine of any or all previous examples wherein the storage control system comprises:

an object sensor configured to sense object presence proximate the travel path;

object detection logic configured to detect whether a portion of the mobile machine and robotic attachment will contact the detected object and generate a contact signal indicative of the detected contact; and a control signal generator configured to generate a control signal to control at least one of the first actuator or the second actuator or the propulsion system based on the contact signal.

Example 17 is the mobile robotic machine of any or all previous examples wherein the storage control system comprises:

a handheld control system configured to receive the return-to-storage user input from a handheld controller and to automatically control the first and second actuators.

Example 18 is a method of operating a mobile machine, the method comprising:

generating a sensor signal indicative of a characteristic of a worksurface on which a worksurface operation is to be performed using a plurality of different tools carried by an end effector on a robotic attachment that is mounted to the mobile machine, each tool performing a corresponding tool operation, in an operation sequence, to perform the worksurface operation;

identifying the worksurface operation to be performed;

automatically identifying a given tool, of the plurality of different tools, that is to perform its corresponding operation on the worksurface, based on the worksurface operation identified;

automatically generating a tool changer control signal to control a tool changer on the robotic attachment to couple the given tool to the end effector; and automatically generating a tool operation signal to control the end effector to operate the given tool to perform its corresponding tool operation.

Example 19 is the method of any or all previous examples wherein generating a sensor signal indicative of a characteristic of the worksurface comprises:

sensing a position of the given tool relative to a position of the worksurface;

generating a position signal indicative of the sensed position of the given tool relative to the position of the worksurface;

sensing a condition of the worksurface, the condition being indicative of whether the given tool has completed its corresponding tool operation; and generating a condition signal indicative of the sensed condition of the worksurface.

Example 20 is the method of any or all previous examples and further comprising:

determining that the given tool has completed its corresponding tool operation on the worksurface based on the position signal and the condition signal;

automatically identifying a next tool, of the plurality of different tools, to perform a next tool operation in the operation sequence;

automatically generating the tool changer control signal to control the tool changer on the robotic attachment to couple the next tool to the end effector; and automatically generating the tool operation signal to control the end effector to operate the next tool to perform its corresponding tool operation.

What is claimed is:

1. A mobile robotic machine, comprising:

a mobile machine having a steering and propulsion system controllable by an operator to drive the mobile machine and a first actuator;

a robotic attachment operably coupled to the mobile machine and positionable by the first actuator, the robotic attachment having an end effector configured to controllably couple to and uncouple from a plurality of different tools, the end effector configured to be disposed between the mobile machine and a tool coupled to the end effector;

a sensor configured to generate a sensor signal indicative of a characteristic of a worksurface on which a worksurface operation is to be performed using the plurality of different tools, each tool, of the plurality of different tools, configured to perform a corresponding tool operation, in an operation sequence defined by the worksurface operation; and a machine and robotic control system, configured to receive the sensor signal and is further configured to:
identify the worksurface;
identify the worksurface operation and corresponding operation sequence; and
generate a control signal to control a tool changer mechanism of the end effector to sequentially couple to the end effector and uncouple from the end effector each of the plurality of different tools, in an order defined by the operation sequence, and to perform the corresponding tool operation on the work surface, with each of the plurality of different tools, to perform the worksurface operation on the worksurface.

2. The robotic machine of claim 1 wherein the end effector comprises:
a tool changer system that carries the plurality of different tools for use by the end effector.

3. The mobile robotic machine of claim 2 wherein the machine and robotic control system comprises:
tool selection logic configured to select one of the plurality of different tools and generate a tool selection signal indicative of the selected tool.

4. The mobile robotic machine of claim 3 wherein the tool changer system is configured to automatically change a tool being used by the end effector to the selected tool based on the tool selection signal.

5. The robotic machine of claim 4 wherein the machine and robotic control system comprises:
tool path generation logic configured to receive the tool selection signal and determine a tool path over which the selected tool is to pass when performing its corresponding tool operation on the worksurface, and to generate a tool path signal indicative of the tool path.

6. The mobile robotic machine of claim 5 wherein the machine and robotic control system comprises:
tool positioner logic configured to receive the tool path signal and generate a position control signal to control the actuator and the robotic attachment to move the selected tool along the tool path.

7. The mobile robotic machine of claim 6 and further comprising:
tool control logic configured to generate a tool operation control signal to operate the tool as the tool is moved along the tool path, to perform its corresponding tool operation.

8. The mobile robotic machine of claim 1 wherein the machine and robotic control system comprises:
a handheld control system configured to receive a user input signal generated by user actuation of a user input mechanism on a handheld controller and generate a control signal for the first actuator to position the robotic attachment relative to the worksurface such that the sensor generates the sensor signal indicative of the worksurface.

9. The mobile robotic machine of claim 8 wherein the handheld control system comprises:
mapping logic configured to receive the user input signal and access a control map that maps the user input signal to a control signal output, to identify a control signal value based on the control signal output, the handheld control system generating the control signal based on the identified control signal value.

10. The mobile robotic machine of claim 1, wherein the robotic attachment further includes:
a robotic platform, disposed between the mobile robotic machine and the end effector, and configured to drive movement of the end effector, the robotic platform comprising:
a platform base;
a platform table;
a plurality of strong, robust actuators disposed between the platform base and the platform table; and
a plurality of fine, low strength actuators disposed between the platform base and the platform table.

11. A method of operating a mobile machine, the method comprising:
generating a sensor signal indicative of a characteristic of a worksurface on which a worksurface operation is to be performed using a plurality of different tools, each different tool in the plurality of different tools configured to perform a different corresponding tool operation in the worksurface operation, in an operation sequence defined by the worksurface operation;
obtaining the sensor signal and identifying the worksurface and worksurface operation;
automatically identifying a given tool, of the plurality of different tools, that is to perform its different corresponding tool operation on the worksurface, based on the identified worksurface operation and the operation sequence defined by the identified worksurface operation;
automatically generating a first tool changer control signal to control a tool changer mechanism on a robotic attachment coupled to the mobile machine, to couple the given tool to an end effector of the robotic attachment; and
automatically generating a tool operation signal to control the end effector to operate the given tool to perform its different corresponding tool operation on the worksurface;
automatically identifying a next tool, of the plurality of tools, that is to perform its different corresponding tool operation on the worksurface, based on the identified worksurface operation and the operation sequence defined by the identified worksurface operation; and
automatically generating a second tool changer control signal to control the tool changer mechanism on the robotic attachment to uncouple the given tool from the end effector and couple the next tool to the end effector.

12. The method of operating a mobile machine of claim 11, and further comprising:
sensing a position of the given tool relative to a position of the worksurface;
generating a position signal indicative of the sensed position of the given tool relative to the position of the worksurface;
sensing a condition of the worksurface, the condition being indicative of whether the given tool has completed its corresponding tool operation on the worksurface; and
generating a condition signal indicative of the sensed condition of the worksurface.

13. The method of operating a mobile machine of claim 12 and further comprising:
determining that the given tool has completed its corresponding tool operation on the worksurface based on the position signal and the condition signal;
automatically generating an additional tool operation signal to control the end effector to operate the next tool to perform its corresponding tool operation; and wherein the second tool changer control signal is generated after determining that the given tool has completed its corresponding tool operation on the worksurface.

14. The method of claim 11, wherein identifying the worksurface and the worksurface operation comprises:

identifying a brick wall as the worksurface and identifying a brick tuck-pointing operation as the worksurface operation.

15. The method of claim 14 and further comprising:

identifying a mortar joint, of the brick wall, as a tool path.

16. The method of claim 15, wherein automatically generating a tool operation signal to control the end effector to operate the given tool to perform its corresponding tool operation on the worksurface comprises:

generating the tool operation signal, based on the identified tool path, to control the end effector to operate the given tool along the identified mortar joint.

\* \* \* \* \*